US012775524B2

(12) United States Patent
Yang

(10) Patent No.: US 12,775,524 B2
(45) Date of Patent: Oct. 27, 2026

(54) METHOD FOR PERFORMING ENHANCED DATA PROTECTION OF MEMORY DEVICE WITH AID OF IN-CHANNEL CODING, AND ASSOCIATED APPARATUS

(71) Applicant: Silicon Motion, Inc., Hsinchu County (TW)

(72) Inventor: Tsung-Chieh Yang, Hsinchu City (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/822,300

(22) Filed: Sep. 2, 2024

(65) Prior Publication Data

US 2026/0064535 A1 Mar. 5, 2026

(51) Int. Cl.
*G06F 11/10* (2006.01)
*G06F 12/02* (2006.01)

(52) U.S. Cl.
CPC ........ *G06F 11/108* (2013.01); *G06F 11/1004* (2013.01); *G06F 12/0292* (2013.01)

(58) Field of Classification Search
CPC ............. G06F 11/1004; G06F 11/1048; G06F 11/108; G11C 16/0483; G11C 16/10; G11C 11/5628; G11C 29/42
See application file for complete search history.

(56) References Cited

U.S. PATENT DOCUMENTS

2011/0107049 A1 5/2011 Kwon
2011/0228604 A1 9/2011 Eli
2020/0310930 A1* 10/2020 Tzoufras ................ G11C 29/42
2022/0004447 A1* 1/2022 Hikichi ................. G06F 11/073
2022/0130457 A1 4/2022 Jean
2024/0054048 A1* 2/2024 Muchherla .......... G06F 11/0793
2024/0185926 A1* 6/2024 Tseng ................... G11C 16/102
2024/0232011 A1* 7/2024 Mulani ............... G06F 13/1673

FOREIGN PATENT DOCUMENTS

TW 201108235 A1 3/2011
TW I652687 3/2019

* cited by examiner

*Primary Examiner* — Michael Maskulinski
(74) *Attorney, Agent, or Firm* — Winston Hsu

(57) ABSTRACT

A method for performing enhanced data protection of a memory device with aid of in-channel coding and associated apparatus are provided, where the memory device may include a memory controller and a non-volatile (NV) memory, and undergo a reflow process for mounting the memory device onto a PCB of a host device within an electronic device. The method may include: during a system level initialization of the electronic device, utilizing the memory controller to start performing expansion-to-non-expansion storage format conversion on preloaded data in the NV memory, wherein the preloaded data has been preloaded into the NV memory in a first storage format, for inserting extra parity information obtained from the in-channel coding among multiple data chunks; and during the expansion-to-non-expansion storage format conversion, converting the preloaded data from the first storage format into a second storage format, for collecting the multiple data chunks and releasing partial storage space.

19 Claims, 15 Drawing Sheets

METHOD FOR PERFORMING ENHANCED DATA PROTECTION OF MEMORY DEVICE WITH AID OF IN-CHANNEL CODING, AND ASSOCIATED APPARATUS

BACKGROUND OF THE INVENTION

1. Field of the Invention

The present invention is related to memory control, and more particularly, to a method for performing enhanced data protection of a memory device with aid of in-channel coding, and associated apparatus such as the memory device, an electronic device comprising the memory device, a memory controller within the memory device, etc.

2. Description of the Prior Art

A memory device may comprise flash memory for storing data, and the management of accessing the flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. in a file system of a host. When the host is implemented as an in-vehicle system, some problems may occur. As the communication capability of a universal asynchronous receiver/transmitter (UART) on a printed circuit board (PCB) of the in-vehicle system may be very limited, loading a large amount of data (e.g., navigation-related data) into the memory device on the PCB may be time consuming, thus making the UART be unsuitable for the loading operation of the large amount of data. A suggestion of preloading the large amount of data into the memory device at a much higher data rate with the aid of a production/manufacturing tool before mounting the memory device onto the PCB may be proposed to try solving the problem, but additional problems such as some side effects may be introduced. For example, regarding mounting the memory device onto the PCB, the memory device may undergo a reflow process that comprises heating at a high temperature (e.g., up to 260 degrees Celsius (° C.)) for one or more predetermined periods of time, which may cause many errors in the data that has been preloaded into the memory device. In addition, the PCB and/or the in-vehicle system comprising the PCB may be stored somewhere with abnormal temperature (e.g., up to 80° C.) for several months, which may cause the data error problem to get even worse. As the preloaded data may have too many errors in a situation where the preloading operation is performed before the memory device is mounted onto the PCB of the in-vehicle system via the reflow process, all existing data protection mechanisms may become insufficient for guaranteeing that the preloaded data can remain recoverable from errors after the high temperature reflow process and the abnormal temperature storage. It seems that there is no proper suggestion in the related art. Thus, a novel method and associated architecture are needed for solving the problems without introducing any side effect or in a way that is less likely to introduce a side effect.

SUMMARY OF THE INVENTION

It is an objective of the present invention to provide a method for performing enhanced data protection of a memory device with aid of in-channel coding, and associated apparatus such as the memory device, an electronic device comprising the memory device, a memory controller within the memory device, etc., in order to solve the above-mentioned problems.

At least one embodiment of the present invention provides a method for performing enhanced data protection of a memory device with aid of in-channel coding, where the method can be applied to a memory controller of the memory device. The memory device may comprise the memory controller and a non-volatile (NV) memory, the NV memory may comprise at least one NV memory element (e.g., one or more NV memory elements), and the memory device may undergo a reflow process for mounting the memory device onto a PCB of a host device within an electronic device. The method may comprise: during a system level initialization of the electronic device, utilizing the memory controller to start performing expansion-to-non-expansion storage format conversion on preloaded data in the NV memory, wherein the preloaded data has been preloaded into the NV memory in a first storage format, for inserting extra parity information obtained from the in-channel coding among multiple data chunks, and operations of the expansion-to-non-expansion storage format conversion comprise garbage collection (GC) and multiple error correction operations for correcting multiple errors in the preloaded data during the GC; and during the expansion-to-non-expansion storage format conversion, converting the preloaded data from the first storage format into a second storage format, for collecting the multiple data chunks from the preloaded data and releasing partial storage space among total storage space occupied by the preloaded data previously stored in the first storage format. For example, the expansion-to-non-expansion storage format conversion may be completed before the system level initialization ends.

In addition to the above method, the present invention also provides a memory controller for performing enhanced data protection of a memory device with aid of in-channel coding, where the memory device comprises the memory controller and an NV memory. The NV memory may comprise at least one NV memory element (e.g., one or more NV memory elements), and the memory device may undergo a reflow process for mounting the memory device onto a PCB of a host device within an electronic device. In addition, the memory controller comprises a processing circuit that is arranged to control the memory controller according to a plurality of host commands from the host device, to allow the host device to access the NV memory through the memory controller. More particularly, during a system level initialization of the electronic device, the memory controller may be arranged to start performing expansion-to-non-expansion storage format conversion on preloaded data in the NV memory, wherein the preloaded data has been preloaded into the NV memory in a first storage format, for inserting extra parity information obtained from the in-channel coding among multiple data chunks, and operations of the expansion-to-non-expansion storage format conversion comprise GC and multiple error correction operations for correcting multiple errors in the preloaded data during the GC; and during the expansion-to-non-expansion storage format conversion, the memory controller may be arranged to convert the preloaded data from the first storage format into a second storage format, for collecting the multiple data chunks from the preloaded data and releasing partial storage space among total storage space occupied by the preloaded data previously stored in the first storage format. For example, the expansion-to-non-expansion storage format conversion may be completed before the system level initialization ends.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

The method of the present invention and the associated apparatus can guarantee that the memory device can operate properly in various situations. For example, the memory controller within the memory device can operate according to at least one control scheme (e.g., one or more control schemes) of the method to perform associated operations, and more particularly, disable the enhanced data protection mechanism (or the associated circuit thereof) by default, and enable the enhanced data protection mechanism (or the associated circuit thereof) in a few cases when there is a need. In a situation where a large amount of data should be preloaded into the memory device before the memory device is mounted onto a PCB within the electronic device such as an in-vehicle system, the memory controller can enable the enhanced data protection mechanism during the preloading operation, in order to perform data expansion as an extraordinary data protection processing for preparing expanded data to generate the data to be programmed into the NV memory while using ordinary data protection processing such as error correction code (ECC) protection processing and redundant array of independent disks (RAID) protection processing as well, and can further enable the enhanced data protection mechanism during a system level initialization of the electronic device (e.g., the in-vehicle system), in order to perform the GC on the expanded data stored in the NV memory while performing data correction. As a result, the preloaded data can remain recoverable from errors after the high temperature reflow process and the abnormal temperature storage. In addition, the method of the present invention and the associated apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
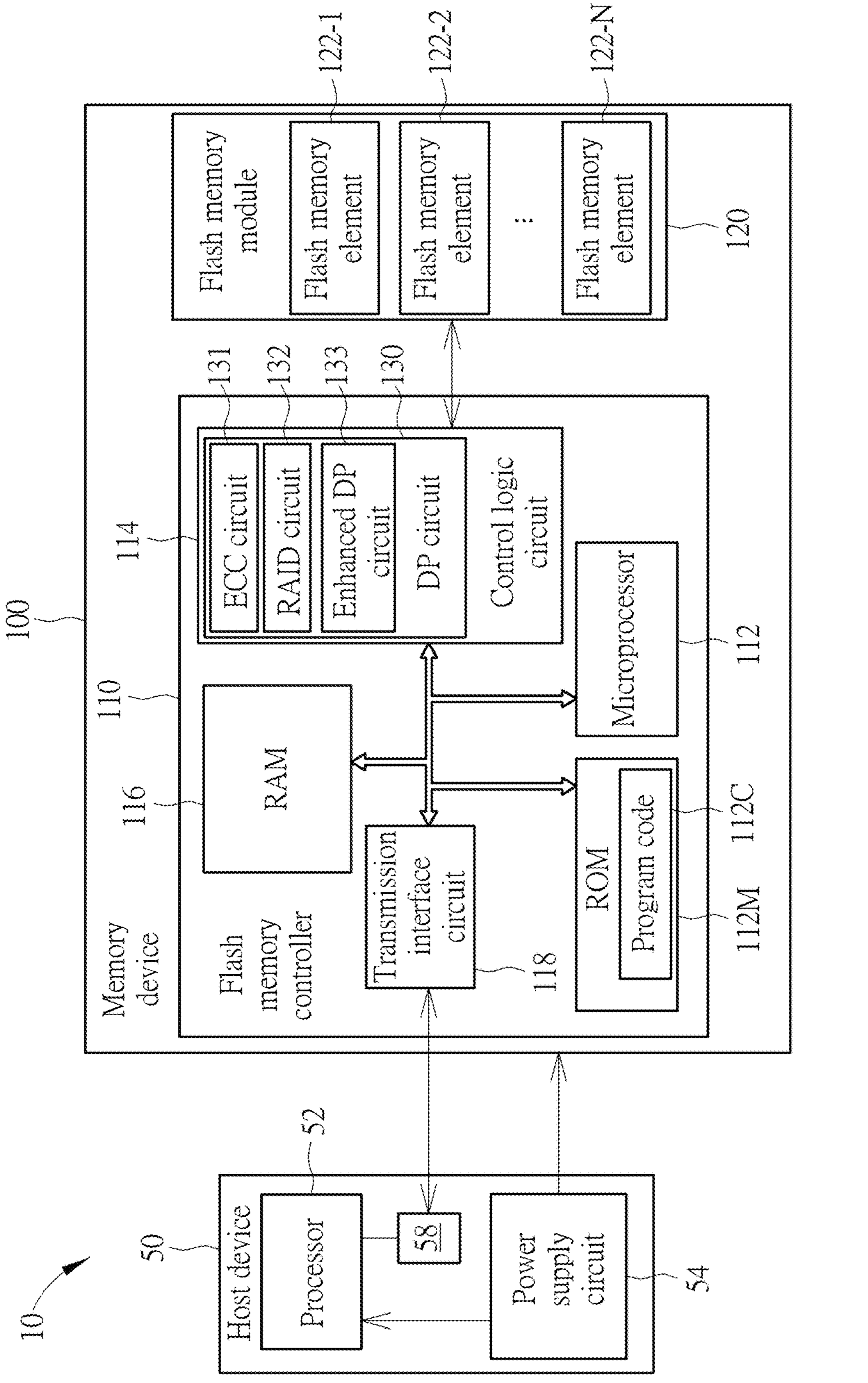
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, and may further comprise a power supply circuit 54 coupled to the processor 52. The processor 52 is arranged for controlling operations of the host device 50, and the power supply circuit 54 is arranged for providing power to the processor 52 and the memory device 100, and outputting one or more driving voltages to the memory device 100. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a wearable device, a tablet computer, a personal computer such as a desktop computer and a laptop computer, as well as a multifunctional in-vehicle system such as an in-car entertainment (ICE), an in-vehicle infotainment (IVI) system, etc. Examples of the memory device 100 may include, but are not limited to: a solid state drive (SSD), and various types of embedded memory devices such as that conforming to Peripheral Component Interconnect Express (PCIe) specification, etc. According to this embodiment, the memory device 100 may comprise a memory controller such as a flash memory controller 110, and may further comprise an NV memory such as a flash memory, and the flash memory may be implemented as a flash memory module 120, where the flash memory controller 110 is arranged to control operations of the memory device 100 and access the flash memory module 120, and the flash memory module 120 is arranged to store information. The NV memory such as the flash memory module 120 may comprise at least one NV memory element such as at least one flash memory element, in particular, a plurality of flash memory elements 122-1, 122-2 . . . and 122-N, where "N" may represent a positive integer that is greater than one. For example, the plurality of flash memory elements 122-1, 122-2 . . . and 122-N may be implemented by way of flash memory chips, flash memory dies, etc. According to some embodiments, the plurality of flash memory elements 122-1, 122-2 . . . and 122-N may be implemented as a plurality of flash memory dies that are packed, stacked and/or integrated into at least one flash memory chip (e.g., one or more flash memory chips), where any flash memory chip among the aforementioned at least one flash memory chip may comprise at least one flash memory dies among the plurality of flash memory dies.

As shown in FIG. 1, the flash memory controller 110 may comprise a processing circuit such as a microprocessor 112, a storage unit such as a read-only memory (ROM) 112M, a control logic circuit 114, a random-access memory (RAM) 116 and a transmission interface circuit 118, where the above components may be coupled to one another via a bus. The RAM 116 is implemented by a Static RAM (SRAM), but the present invention is not limited thereto. The RAM 116 may be arranged to provide the flash memory controller 110 with internal storage space. For example, the RAM 116 may be utilized as a buffer memory for buffering data. In addition, the ROM 112M of this embodiment is arranged to store a program code 112C, and the microprocessor 112 is arranged to execute the program code 112C to control the access of the flash memory module 120. Note that, in some examples, the program code 112C may be stored in the RAM 116 or any type of memory. Further, the control logic circuit 114 may be arranged to control the flash memory module 120, and may comprise a data protection (DP) circuit 130 (labeled "DP circuit" for brevity) for performing data protection processing operations. The data protection circuit 130 may comprise an ECC circuit 131, a RAID circuit 132, an enhanced data protection circuit 133 (labeled "enhanced DP circuit" for brevity) and other circuits. Regarding ordinary data protection processing operations among the data protection processing operations, the ECC circuit 131 may perform ECC encoding and ECC decoding, in order to protect data and/or perform error correction for any sub-storage-unit of multiple sub-storage-units within a physical page, and the RAID circuit 132 may perform RAID encoding and RAID decoding, in order to protect data and/or perform error correction for a physical page group such as a group of physical pages, but the present invention is not limited thereto. For example, the multiple sub-storage-units may have a same size, such as a predetermined size smaller than that of the physical page. Additionally, the enhanced data protection circuit 133 may perform enhanced data protection processing operations as extraordinary data protection processing operations among the data protection processing operations to further protect data in a more secure manner for one or more predetermined scenarios. As the enhanced data protection processing operations are time consuming, the flash memory controller 110 (or the processing circuit therein such as the microprocessor 112) may disable the enhanced data protection circuit 133 by default, and enable the enhanced data protection circuit 133 in a few cases when there is a need.

The transmission interface circuit 118 may conform to one or more communications specifications among various communications specifications (e.g., Serial Advanced Technology Attachment (Serial ATA, or SATA) specification, Universal Serial Bus (USB) specification, Peripheral Component Interconnect (PCI) specification, Peripheral Component Interconnect Express (PCIe) specification, embedded Multi Media Card (eMMC) specification, and Universal Flash Storage (UFS) specification), and may perform communications with the host device 50 (or a corresponding transmission interface circuit therein such as the transmission interface circuit 58) according to the one or more communications specifications for the memory device 100. Similarly, the transmission interface circuit 58 may conform to the one or more communications specifications, and may perform communications with the memory device 100 (or the transmission interface circuit 118 therein) according to the one or more communications specification for the host device 50.

In this embodiment, the host device 50 may transmit host commands and corresponding logical addresses to the flash memory controller 110 to access the memory device 100. The flash memory controller 110 receives the host commands and the logical addresses, and translates the host commands into memory operating commands (which may be simply referred to as operating commands), and further controls the flash memory module 120 with the operating commands to perform reading, writing/programing, etc. on memory units (e.g., data pages) having physical addresses within the flash memory module 120, where the physical addresses can be associated with the logical addresses. When the flash memory controller 110 perform an erase operation on any flash memory element 122-*n* among the plurality of flash memory elements 122-1, 122-2 . . . and 122-N (in which "n" may represent any integer in the interval [1, N]), at least one block of multiple blocks of the flash memory element 122-*n* may be erased, where each block of the blocks may comprise multiple pages (e.g., data pages), and an access operation (e.g., a reading operation or a writing operation) may be performed on one or more pages.

Figure 2:
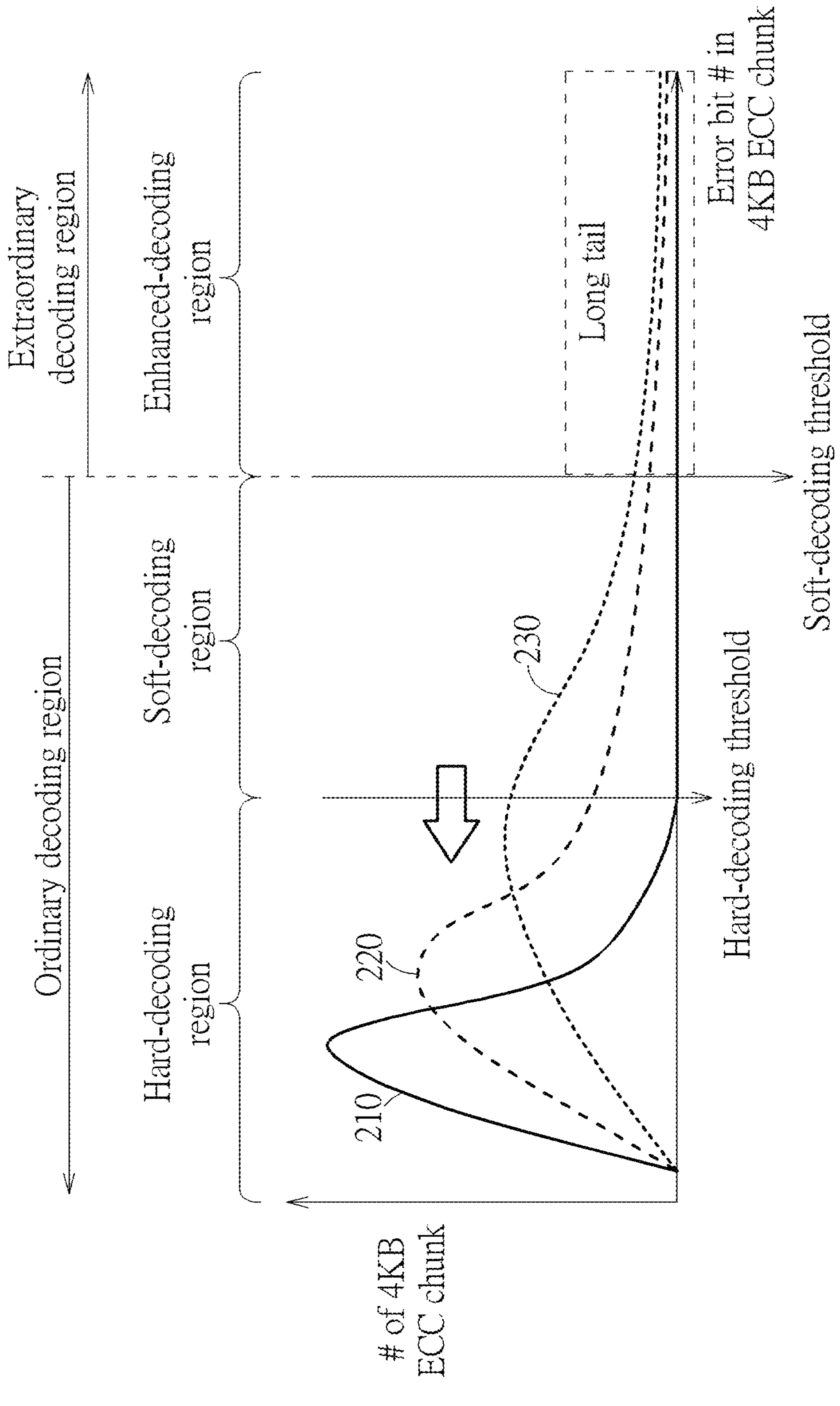
FIG. 2 illustrates an encoding/decoding control scheme of a method for performing enhanced data protection of a memory device with aid of in-channel coding according to an embodiment of the present invention.

FIG. 2 illustrates an encoding/decoding control scheme of a method for performing enhanced data protection of a memory device (e.g., the memory device 100 shown in FIG. 1) with aid of in-channel coding according to an embodiment of the present invention. The horizontal axis may represent the error bit number (or "the error bit #") in a 4096 bytes or 4 kilo-bytes (KB) ECC chunk (referred to as "the 4 KB ECC chunk" for brevity), and the vertical axis may represent the number (or "the #") of 4 KB ECC chunks. The range of the horizontal axis may be divided into multiple intervals or regions. As shown in FIG. 2, the ordinary decoding region on the left-hand side of the soft-decoding threshold may comprise two sub-regions such as the soft-decoding region and the hard-decoding region that are divided by the hard-decoding threshold, and the extraordinary decoding region on the right-hand side of the soft-decoding threshold may comprise the enhanced-decoding region. For example, the curves 210, 220 and 230 may correspond to different levels of data health such as good data health, poor data health and worse data health, respectively. Taking a triple-level cell (TLC) flash memory as an example of the flash memory module 120, the associated operations may comprise:

(1) regarding a first curve (e.g., the curve 210) which is entirely in the hard-decoding region, when reading any 4 KB ECC chunk among all 4 KB ECC chunks, the flash memory controller 110 may merely read three bits per memory cell for performing hard-decoding, having no need to perform soft-decoding;

(2) regarding a second curve with two partial curves thereof respectively located in the hard-decoding region and the soft-decoding region, when reading any 4 KB ECC chunk among the 4 KB ECC chunks corresponding to the soft-decoding region, the flash memory controller 110 may read three bits per memory cell for performing hard-decoding and further read soft bit information for performing soft-decoding, causing the throughput to be decreased, where the flash memory controller 110 may merely read three bits per memory cell for performing hard-decoding when reading a 4 KB ECC chunk corresponding to the hard-decoding region; and (3) regarding a third curve (e.g., any curve among the curves 220 and 230) with three partial curves respectively located in the hard-decoding region, the soft-decoding region and the enhanced-decoding region, when reading any 4 KB ECC chunk among the 4 KB ECC chunks corresponding to the enhanced-decoding region, the flash memory controller 110 may enable the enhanced data protection circuit 133 to perform enhanced decoding, where the flash memory controller 110 may merely read three bits per memory cell for performing hard-decoding when reading a 4 KB ECC chunk corresponding to the hard-decoding region, and may read three bits per memory cell for performing hard-decoding and further read soft bit information for performing soft-decoding when reading a 4 KB ECC chunk corresponding to the soft-decoding region;

but the present invention is not limited thereto. According to some embodiments, the level count per cell (e.g., three) of the memory cells (e.g., the TLCs) in the flash memory module 120, the chunk size (e.g., 4 KB) of the ECC chunks in the above operations, the hard-decoding threshold, the soft-decoding threshold, the curves 210, 220 and 230, and/or the associated parameters may vary. In addition, the aforementioned few cases may comprise the case corresponding to the long tail shown in the lower right part of FIG. 2.

According to some embodiments, the hard-decoding threshold may be regarded as the most important factor for the read performance since the soft-information fetch operations will consume the time corresponding to multiple read commands (or a multiple of the read time tR). For example, the 4 KB low-density parity-check (LDPC) code hard-decoding may provide better tradeoff than that of the 2 KB or 1 KB LDPC code hard-decoding. The soft-decoding region (or a partial region thereof adjacent to the hard-decoding region) may move into the hard-decoding region as a result of reducing the error bits or enlarging/increasing the hard-decoding capability. For the most advanced quad-level cell (QLC) or triple-level cell (TLC) flash memories, the experience may indicate that the soft-decoding region can be improved or reduced, but the long tail of the error bit distribution may become more serious. Even if the lowest error bit read method involved with the ordinary data protection processing operations is used, a few worse condition chunks may still exist. The flash memory controller 110 may operate according to at least one control scheme (e.g., one or more control schemes) of the method to perform the enhanced decoding, in order to provide higher reliability of the memory device 100 (e.g., the SSD).

Figure 3:
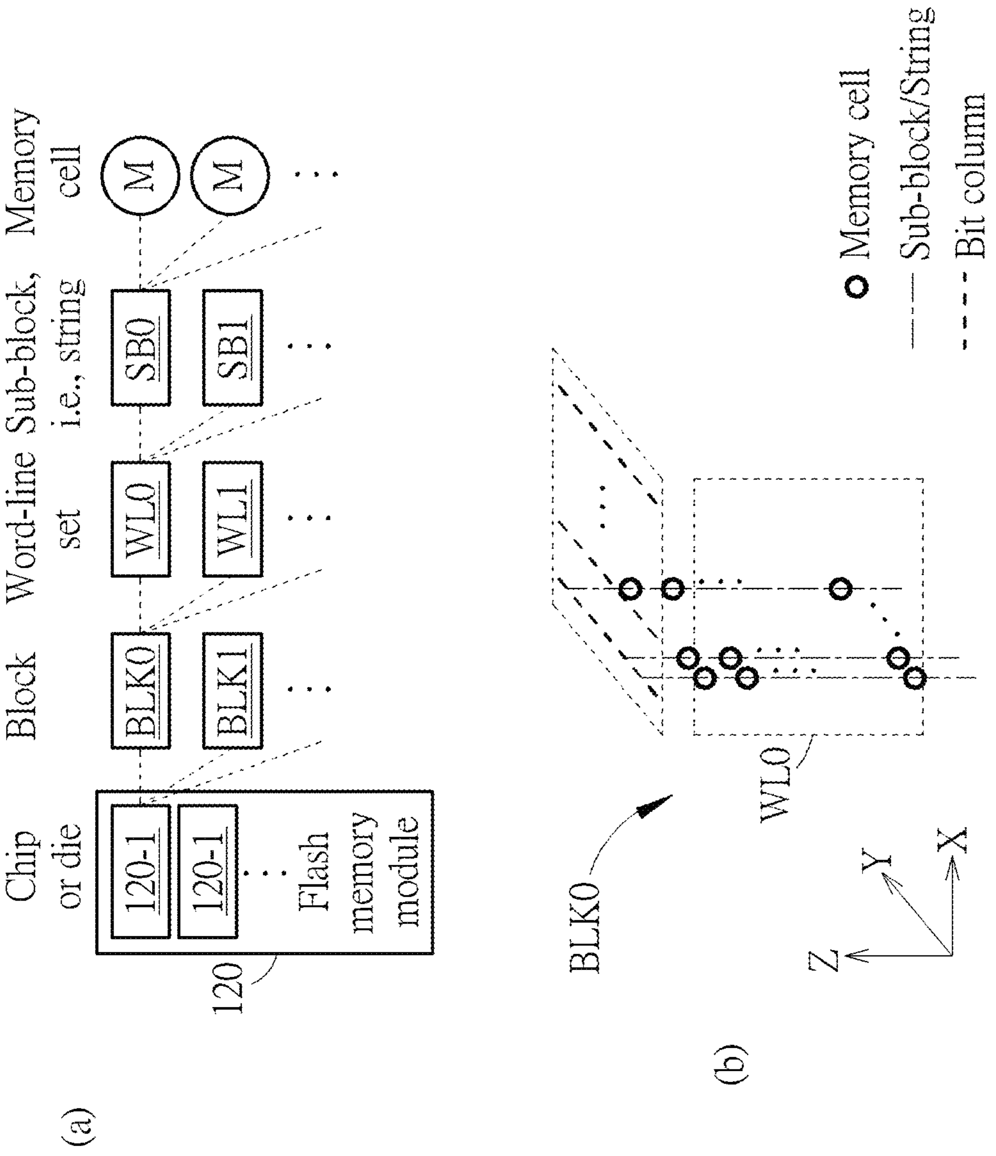
FIG. 3 illustrates a hierarchical control scheme of the method according to an embodiment of the present invention.

FIG. 3 illustrates a hierarchical control scheme of the method according to an embodiment of the present invention. The aforementioned at least one NV memory element may comprise a plurality of blocks {BLK}, and any block BLK among the plurality of blocks {BLK} may comprise multiple sub-blocks {SB}. For example, when the aforementioned at least one NV memory element is implemented as the plurality of flash memory elements 122-1, 122-2 . . . and 122-N, the aforementioned any flash memory element 122-*n* among the plurality of flash memory elements 122-1, 122-2 . . . and 122-N may comprise a subset of the plurality of blocks {BLK}.

As shown in the sub-diagram (a), the aforementioned any flash memory element 122-*n* (e.g., the flash memory element 122-1) among the plurality of flash memory elements 122-1, 122-2 . . . and 122-N may comprise the multiple blocks such as the blocks {BLK0, BLK1, . . . }, any block BLK (e.g., the block BLK0) among the blocks {BLK0, BLK1, . . . } may comprise multiple word-line sets {WL0, WL1, . . . }, any word-line set (e.g., the word-line set WL0) among the word-line sets {WL0, WL1, . . . } may comprise multiple sub-blocks (or strings) {SB0, SB1, . . . }, and any sub-block SB among the sub-blocks {SB0, SB1, . . . } may comprise multiple memory cells {M}. As shown in the sub-diagram (b), in the aforementioned any block BLK such as the block BLK0, the aforementioned any word-line set such as the word-line set WL0 may be arranged in a plane parallel to the X-Z plane comprising the X-axis and the Z-axis, and the bit columns for respectively coupling the sub-blocks (or strings) {SB} may be arranged in a plane parallel to the X-Y plane comprising the X-axis and the Y-axis, but the present invention is not limited thereto. According to some embodiments, the architecture shown in FIG. 3 and/or the associated arrangement may vary.

Figure 4:
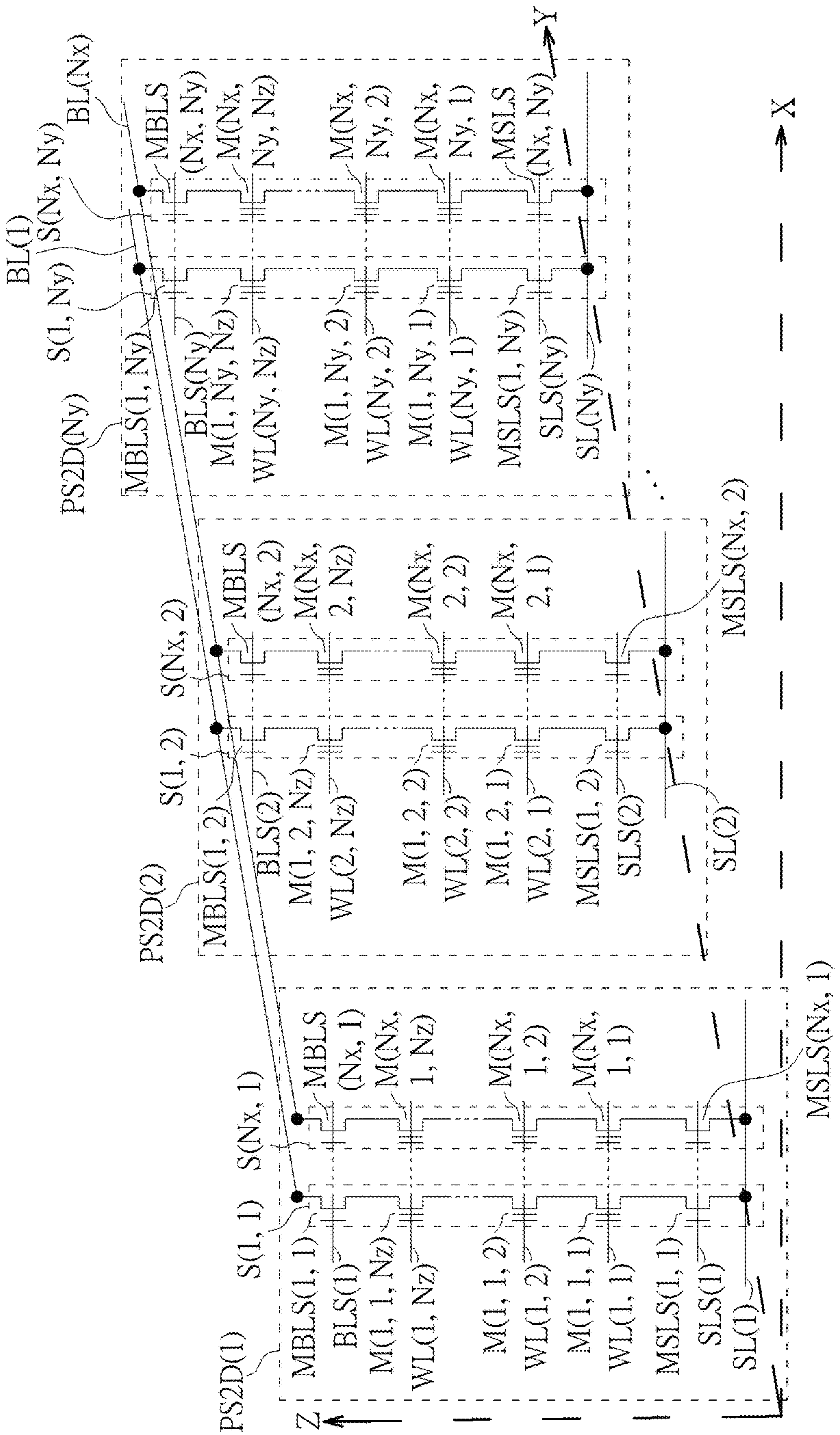
FIG. 4 is a diagram of a three-dimensional (3D) NAND flash memory involved with the hierarchical control scheme shown in FIG. 3 according to an embodiment of the present invention.

FIG. 4 is a diagram of a three-dimensional (3D) NAND flash memory involved with the hierarchical control scheme shown in FIG. 3 according to an embodiment of the present invention. For example, any memory element among the plurality of flash memory elements 122-1, 122-2 . . . and 122-N may be implemented by way of the 3D NAND flash memory shown in FIG. 4, but the present invention is not limited thereto.

According to this embodiment, the 3D NAND flash memory may comprise a plurality of memory cells arranged in a 3D structure, such as (Nx*Ny*Nz) memory cells {{M(1, 1, 1), . . . , M(Nx, 1, 1)}, {M(1, 2, 1), . . . , M(Nx, 2, 1)}, . . . , {M(1, Ny, 1), . . . , M(Nx, Ny, 1)}}, {{M(1, 1, 2), . . . , M(Nx, 1, 2)}, {M(1, 2, 2), . . . , M(Nx, 2, 2)}, . . . , {M(1, Ny, 2), . . . , M(Nx, Ny, 2)}}, . . . , and {{M(1, 1, Nz), . . . , M(Nx, 1, Nz)}, {M(1, 2, Nz), . . . , M(Nx, 2, Nz)}, . . . , {M(1, Ny, Nz), . . . , M(Nx, Ny, Nz)}} that are respectively arranged in Nz layers perpendicular to the Z-axis and aligned in three directions respectively corresponding to the X-axis, the Y-axis, and the Z-axis, and may further comprise a plurality of selector circuits for selection control, such as (Nx*Ny) upper selector circuits {MBLS(1, 1), . . . , MBLS(Nx, 1)}, {MBLS(1, 2), . . . , MBLS(Nx, 2)}, . . . , and {MBLS(1, Ny), . . . , MBLS(Nx, Ny)} that are arranged in an upper layer above the Nz layers and (Nx*Ny) lower selector circuits {MSLS(1, 1), . . . , MSLS(Nx, 1)}, {MSLS(1, 2), . . . , MSLS(Nx, 2)}, . . . , and {MSLS(1, Ny), . . . , MSLS(Nx, Ny)} that are arranged in a lower layer below the Nz layers. In addition, the 3D NAND flash memory may comprise a plurality of bit lines and a plurality of word lines for access control, such as Nx bit lines BL(1), . . . , and BL(Nx) that are arranged in a top layer above the upper layer and (Ny*Nz) word lines {WL(1, 1), WL(2, 1), . . . , WL(Ny, 1)}, {WL(1, 2), WL(2, 2), . . . , WL(Ny, 2)}, . . . , and {WL(1, Nz), WL(2, Nz), . . . , WL(Ny, Nz)} that are respectively arranged in the Nz layers. Additionally, the 3D NAND flash memory may comprise a plurality of selection lines for selection control, such as Ny upper selection lines BLS(1), BLS(2), . . . , and BLS(Ny) that are arranged in the upper layer and Ny lower selection lines SLS(1), SLS(2), . . . , and SLS(Ny) that are arranged in the lower layer, and may further comprise a plurality of source lines for providing reference levels, such as Ny source lines SL(1), SL(2), . . . , and SL(Ny) that are arranged in a bottom layer below the lower layer.

As shown in FIG. 4, the 3D NAND flash memory may be divided into Ny circuit modules PS2D(1), PS2D(2), . . . , and PS2D(Ny) distributed along the Y-axis. For better comprehension, the circuit modules PS2D(1), PS2D(2), . . . , and PS2D(Ny) may have some electrical characteristics similar to that of a planar NAND flash memory having memory cells arranged in a single layer, and therefore may be regarded as pseudo-2D circuit modules, respectively, but the present invention is not limited thereto. In addition, any circuit module PS2D(ny) of the circuit modules PS2D(1), PS2D(2), . . . , and PS2D(Ny) may comprise Nx secondary circuit modules S(1, ny), . . . , and S(Nx, ny), where "ny" may represent any integer in the interval [1, Ny]. For example, the circuit module PS2D(1) may comprise Nx secondary circuit modules S(1, 1), . . . , and S(Nx, 1), the circuit module PS2D(2) may comprise Nx secondary circuit modules S(1, 2), . . . , and S(Nx, 2), . . . , and the circuit module PS2D(Ny) may comprise Nx secondary circuit modules S(1, Ny), . . . , and S(Nx, Ny). In the circuit module PS2D(ny), any secondary circuit module S(nx, ny) of the secondary circuit modules S(1, ny), . . . , and S(Nx, ny) may comprise Nz memory cells M(nx, ny, 1), M(nx, ny, 2), . . . , and M(nx, ny, Nz), and may comprise a set of selector circuits corresponding to the memory cells M(nx, ny, 1), M(nx, ny, 2), . . . , and M(nx, ny, Nz), such as the upper selector circuit MBLS(nx, ny) and the lower selector circuit MSLS(nx, ny), where "nx" may represent any integer in the interval [1, Nx]. The upper selector circuit MBLS(nx, ny) and the lower selector circuit MSLS(nx, ny) and the memory cells M(nx, ny, 1), M(nx, ny, 2), . . . , and M(nx, ny, Nz) may be implemented with transistors. For example, the upper selector circuit MBLS(nx, ny) and the lower selector circuit MSLS(nx, ny) may be implemented with ordinary transistors without any floating gate, and any memory cell M(nx, ny, nz) of the memory cells M(nx, ny, 1), M(nx, ny, 2), . . . , and M(nx, ny, Nz) may be implemented with a floating gate transistor, where "nz" may represent any integer in the interval [1, Nz], but the present invention is not limited thereto. Further, the upper selector circuits MBLS(1, ny), . . . , and MBLS(Nx, ny) in the circuit module PS2D(ny) may perform selection according to the selection signal on the corresponding selection line BLS(ny), and the lower selector circuits MSLS(1, ny), . . . , and MSLS(Nx, ny) in the circuit module PS2D(ny) may perform selection according to the selection signal on the corresponding selection line SLS(ny).

For better comprehension, the architecture shown in FIG. 4, the circuit modules {PS2D(ny)|ny=1 . . . Ny}, the secondary circuit modules {S(nx, ny)|nx=1 . . . Nx, ny=1 . . . Ny}, the memory cells {M(nx, ny, nz)|nx=1 . . . Nx, ny=1 . . . Ny, nz=1 . . . Nz} and the bit lines {BL (Nx)|nx=1 . . . Nx} as shown in FIG. 4 may be taken as examples of the aforementioned any block BLK among the blocks {BLK0, BLK1, . . . }, the word-line sets {WL0, WL1, . . . }, the sub-blocks (or the strings) {SB0, SB1, . . . }, the memory cells {M} and the bit column in the embodiment shown in FIG. 3, respectively, but the present invention is not limited thereto.

Figure 5:
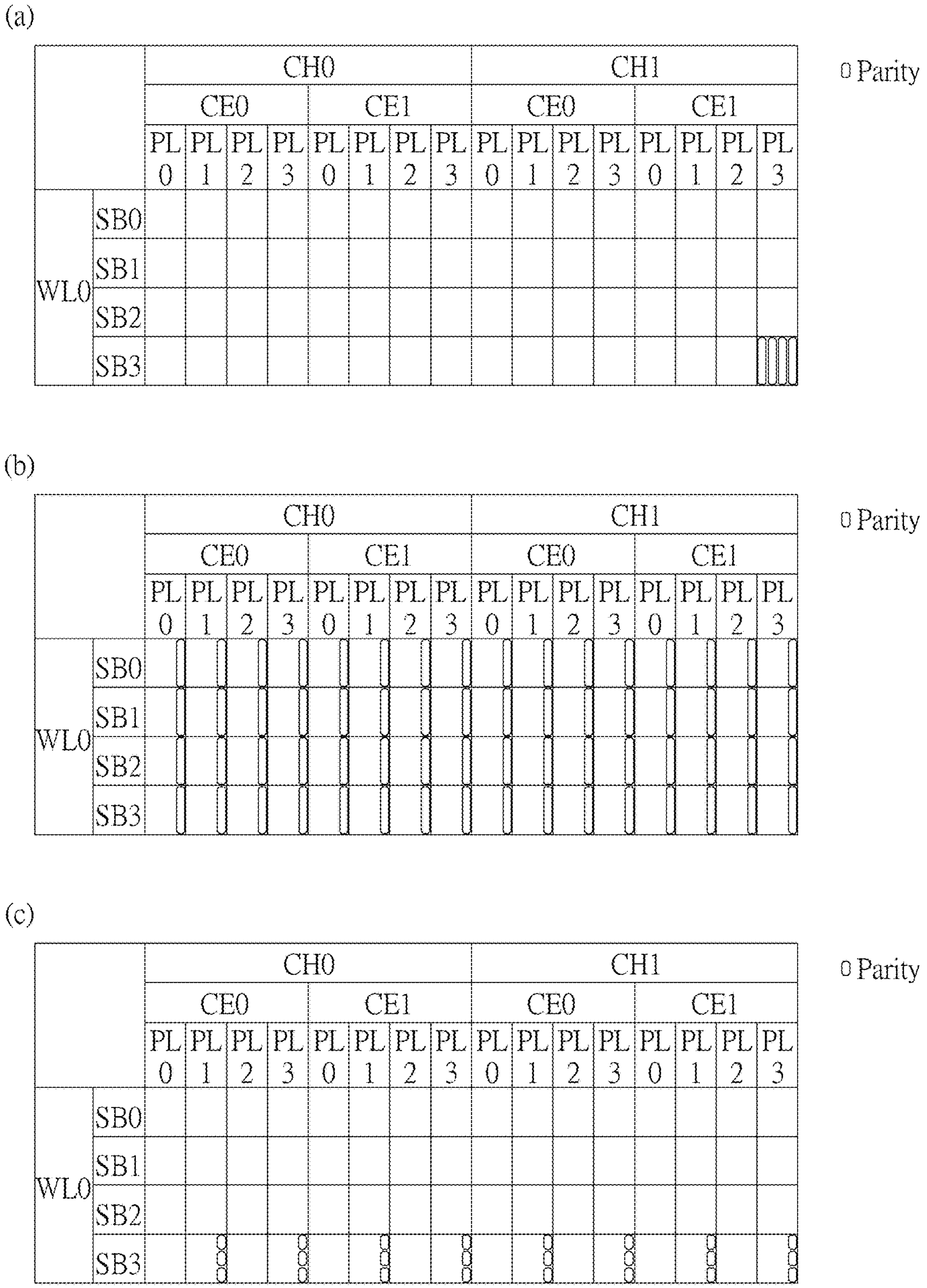
FIG. 5 illustrates, in the sub-diagrams (a), (b) and (c) thereof, a first RAID parity location control scheme, a second RAID parity location control scheme and a third RAID parity location control scheme of the method according to different embodiments of the present invention.

FIG. 5 illustrates, in the sub-diagrams (a), (b) and (c) thereof, a first RAID parity location control scheme, a second RAID parity location control scheme and a third RAID parity location control scheme of the method according to different embodiments of the present invention, where the parities in the first RAID parity location control scheme may be regarded as cross-channel RAID protection parities (or "the cross-channel parities"). Taking a four-planes flash memory as an example of the flash memory module 120, the aforementioned any flash memory element 122-*n* may be implemented as a flash memory chip/die having multiple planes {PL} such as four planes {PL0, PL1, PL2, PL3}, with any plane PL (e.g., one of the planes {PL}) comprising multiple blocks {BLK} such as the blocks {BLK0, BLK1, . . . }, and the flash memory controller 110 may selectively enable or disable the flash memory element 122-*n* with a corresponding chip enable signal CE of multiple chip enable signals {CE} in a corresponding channel CH of multiple channels {CH} of the flash memory module 120, to allow all flash memory elements (e.g., the flash memory element 122-*n*) in any channel CH (e.g., the corresponding channel CH) among the multiple channels {CH} to share a bus between an encoder (not shown in FIG. 5) in the aforementioned any channel CH and these flash memory elements, and may access (e.g., read or write) these flash memory elements sharing the same bus in turn for maximizing the throughput when there is a need.

Assuming that the multiple channels {CH} comprise the channels {CH0, CH1} and the multiple chip enable signals {CE} comprise the chip enable signals {CE0, CE1}, the flash memory controller 110 may perform the RAID protection processing with the aid of the RAID circuit 132 according to the first RAID parity location control scheme shown in the sub-diagram (a) to generate the RAID parity at the sub-block (or the string) SB3 in the plane PL3 of the chip/die corresponding to the chip enable signal CE1 in the channel CH1 for the aforementioned any word-line set (e.g., the word-line set WL0), but the present invention is not limited thereto. The flash memory controller 110 may generate the parities in an in-channel manner, and these parities may be regarded as in-channel RAID protection parities (or "the in-channel parities"). For example, in the embodiment shown in the sub-diagram (b), the flash memory controller 110 may perform the enhanced data protection processing with the aid of the enhanced data protection circuit 133 to generate the parities at the respective ending parts of the sub-blocks (or the strings) {SB0, SB1, SB2, SB3} in each plane PL of the planes {PL0, PL1, PL2, PL3} of the chips/dies respectively corresponding to the chip enable signals {CE0, CE1} in the channels {CH0, CH1} for the aforementioned any word-line set (e.g., the word-line set WL0); and in the embodiment shown in the sub-diagram (c), assuming that the blocks {BLK} are configured as TLC blocks, the flash memory controller 110 may perform the enhanced data protection processing with the aid of the enhanced data protection circuit 133 to generate the parities at the ending part of the sub-block (or the string) SB3 in each plane PL of the planes {PL0, PL1, PL2, PL3} of the chips/dies respectively corresponding to the chip enable signals {CE0, CE1} in the channels {CH0, CH1} for the aforementioned any word-line set (e.g., the word-line set WL0). This is for illustrative purposes only, and is not meant to be a limitation of the present invention. According to some other embodiments, the level count per cell (e.g., three) of the memory cells (e.g., the TLCs) in the flash memory module 120, the channel count (e.g., two) of the channels {CH} (e.g., the channels {CH0, CH1}) in the flash memory module 120, the chip enable signal count (e.g., two) of the chip enable signals {CE} in the aforementioned any channel CH (e.g., one of the channels {CH0, CH1}), the plane count (e.g., four) of the planes {PL} in the chip/die corresponding to any chip enable signal CE (e.g., one of the chip enable signals {CE0, CE1}) in the aforementioned any channel CH, the sub-blocks/strings count (e.g., four) of the sub-blocks/strings {SB} in the aforementioned any word-line set (e.g., the word-line set WL0), and/or the parity locations may vary.

Figure 6:
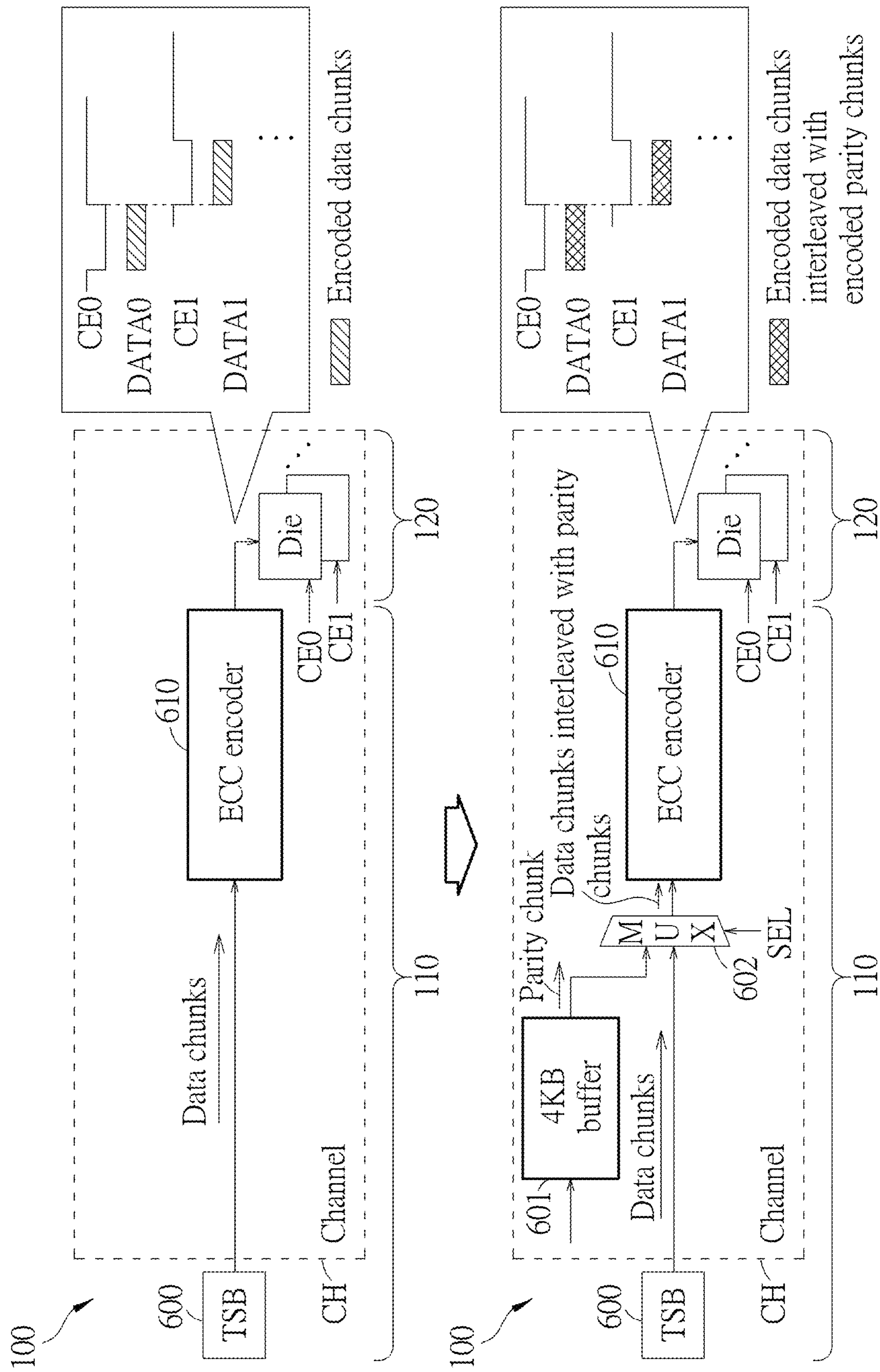
FIG. 6 illustrates, in the lower half part thereof, an in-channel data-expansion and encoding control scheme of the method according to an embodiment of the present invention, where an in-channel encoding control scheme is illustrated in the upper half part of FIG. 6 for better comprehension.

FIG. 6 illustrates, in the lower half part thereof, an in-channel data-expansion and encoding control scheme of the method according to an embodiment of the present invention, where an in-channel encoding control scheme is illustrated in the upper half part of FIG. 6 for better comprehension. Assume that one or more functions of the memory device 100 may be temporarily disabled to allow the flash memory controller 110 and the flash memory module 120 to operate according to the in-channel encoding control scheme shown in the upper half part of FIG. 6, but the present invention is not limited thereto. Based on the in-channel encoding control scheme, the flash memory controller 110 may utilize an ECC encoder 610 (e.g., an LDPC code encoder) within the ECC circuit 131 shown in FIG. 1 to encode multiple data chunks from a time sharing buffer (TSB) 600 within the flash memory controller 110 to generate multiple encoded data chunks as the data {DATA0, DATA1, . . . } for being programmed into the dies in the same channel CH in turn under the control of the chip enable signals {CE} such as the chip enable signals {CE0, CE1, . . . }. Although the ECC circuit 131 and the RAID circuit 132 may perform the ECC encoding/decoding and the RAID encoding/decoding for data protection, respectively, they may be insufficient for guaranteeing that the data can remain recoverable from errors in the aforementioned few cases.

As shown in the lower half part of FIG. 6, the flash memory controller 110 may operate according to the in-channel data-expansion and encoding control scheme, to expand the multiple data chunks from the TSB 600 into expanded data such as the multiple data chunks interleaved with multiple party chunks, with any parity chunk thereof comprising the parity of a set of data chunks among the multiple data chunks, in order to achieve a better overall performance. More particularly, regarding the aforementioned any channel CH among the multiple channels {CH}, the enhanced data protection circuit 133 shown in FIG. 1 may comprise an in-channel buffer 601 having a buffer size which may be equal to or approximately equal to 4 KB (labeled "4 KB buffer" for brevity), a multiplexer circuit 602 (labeled "MUX" for brevity) which may be controlled with a selection signal SEL thereof as well as associated signal paths for coupling the in-channel buffer 601 between the TSB 600 and the ECC encoder 610, and the flash memory controller 110 may disable the enhanced data protection circuit 133 by default, and enable the enhanced data protection circuit 133 in the aforementioned few cases (e.g., the case corresponding to the long tail shown in the lower right part of FIG. 2) when there is a need. In a situation where a large amount of data should be preloaded into the memory device 100 (or the flash memory module 120) before the memory device 100 is mounted onto a PCB within the electronic device 10 such as the multifunctional in-vehicle system via a reflow process such as that mentioned above, the flash memory controller 110 can enable the enhanced data protection circuit 133 during the preloading operation, in order to perform data expansion as the extraordinary data protection processing for preparing the expanded data to generate the data to be programmed into the flash memory module 120 while using the ordinary data protection processing such as the ECC protection processing of the ECC circuit 131 and the RAID protection processing of the RAID circuit 132 as well, for protecting the preloaded data with both of the ordinary data protection processing and the extraordinary data protection processing, and can further enable the enhanced data protection circuit 133 during a system level initialization of the electronic device 10 (e.g., the multifunctional in-vehicle system) for performing expansion-to-non-expansion storage format conversion on the preloaded data, in order perform GC on the preloaded data in the flash memory module 120 while performing data correction.

For example, during the preloading operation, the flash memory controller 110 can perform the data expansion with the enhanced data protection circuit 133 on host data from the host device, such as the data that is sent from the host device and buffered in the TSB 600, to generate a series of small chunks corresponding to the host data, such as chunks having a common size which may be less than and close to 4 KB, including the data chunks interleaved with the parity chunks, before sending the small chunks into the ECC encoder 610, in order to pack the parity chunks among the data chunks in an expansion storage format as if the parity chunks are parts of the host data from the TSB 600, for being programmed into the flash memory module 120. As a result, the flash memory controller 110 may utilize the ECC encoder 610 to encode the expanded data (e.g., the multiple data chunks interleaved with the multiple party chunks) to generate encoded expanded data (e.g., multiple encoded data chunks interleaved with multiple encoded party chunks) as the data {DATA0, DATA1, . . . } for being programmed into the dies in the same channel CH in turn under the control of the chip enable signals {CE} such as the chip enable signals {CE0, CE1, . . . }. By performing the data expansion to make the preloaded data be stored in the expansion storage format for the enhanced data protection, the preloaded data in the memory device 100 (or the flash memory module 120 therein) can remain recoverable from errors.

During the system level initialization, the flash memory controller 110 can perform the GC on the preloaded data in the flash memory module 120 to copy a set of data chunks among the preloaded data from a source block $BLK_{SOURCE}$ into a destination block $BLK_{DESTINATION}$, and more particularly, selectively perform error correction for recovering the set of data chunks before copying the set of data chunks from the source block $BLK_{SOURCE}$ into the destination block $BLK_{DESTINATION}$, in order to make the resultant data chunks in the destination blocks $\{BLK_{DESTINATION}\}$ be stored in a non-expansion storage format for normal use after the system level initialization. For example, if there is no error in the set of data chunks among the preloaded data in the flash memory module 120, the flash memory controller 110 may keep the set of data chunks while discarding a parity chunk for protecting the set of data chunks; otherwise, in a situation where any error in the set of data chunks among the preloaded data in the flash memory module 120 is detected, the flash memory controller 110 may perform the error correction on the set of data chunks according to the parity chunk to recover the set of data chunks and then discard the erroneous data chunk(s) as well as the parity chunk. As a result, the preloaded data can remain recoverable from errors after the high temperature reflow process and the abnormal temperature storage. As the time for performing the expansion-to-non-expansion storage format conversion (or the GC as well as the error correction) is hidden in the time for performing the system level initialization, nobody will complain about any extra time required for doing so since the system level initialization itself may take a long time such as one or more hours.

Some implementation details regarding the electronic device 10 such as the multifunctional in-vehicle system may be further described as follows. According to some embodiments, the host device 50 may be equipped with a simple communication component (e.g., a UART and/or a communication port conforming to inter-integrated circuit ($I^2C$) specification), to provide an option of loading system data of the multifunctional in-vehicle system into the memory device 100 (or the flash memory module 120 therein) at a low data rate by the processor 52 (e.g., a central processing unit (CPU)) via the simple communication component before the system level initialization. The system data of the multifunctional in-vehicle system may have a data size $SIZE_{SYSTEM}$ of 12 gigabytes (GB), and the total time required for loading the system data at the low data rate via the simple communication component is too long, so it is impractical to implement the multifunctional in-vehicle system by using this option. As a result, preloading the large amount of data into the memory device 100 (or the flash memory module 120) before the memory device 100 is mounted onto the PCB via the reflow process as described above is a must. Assuming that the storage capacity $SIZE_{CAPACITY}$ of the flash memory module 120 is equal to 16 GB, the ratio $RATIO_{SYSTEM\text{-}to\text{-}CAPACITY}$ of the data size $SIZE_{SYSTEM}$ to the storage capacity $SIZE_{CAPACITY}$ may be expressed as follows:

$$RATIO_{SYSTEM\text{-}to\text{-}CAPACITY} = (SIZE_{SYSTEM}/SIZE_{CAPACITY}) = (12/16) = 75\%;$$

but the present invention is not limited thereto. In addition, taking the TLC flash memory as an example of the flash memory module 120, for any memory cell M among all memory cells {M} of the flash memory module 120, one programming state among eight programming state may be corrupted by the high temperature of the reflow process, causing the ordinary data protection processing (e.g., the ECC protection processing of the ECC circuit 131 and the RAID protection processing of the RAID circuit 132) to become insufficient for guaranteeing that the preloaded data can remain recoverable from errors after the high temperature reflow process. By using the extraordinary data protection processing mentioned above, the preloaded data can remain recoverable from errors after the high temperature reflow process and the abnormal temperature storage.

TABLE 1A

| Chunk #1 | Chunk #2 | Chunk #3 | Chunk #4 |
|---|---|---|---|
| Data chunk | Data chunk | Data chunk | Parity chunk |

TABLE 1B

| Encoded chunk #1 | Encoded chunk #2 | Encoded chunk #3 | Encoded chunk #4 |
|---|---|---|---|
| Encoded data chunk | Encoded data chunk | Encoded data chunk | Encoded parity chunk |

Table 1A illustrates an example of the expansion storage format, and Table 1B illustrates an example of the expanded ECC-encoded data format corresponding to the expansion storage format, where the flash memory controller 110 may perform the data expansion with the enhanced data protection circuit 133 to prepare the series of small chunks in the expansion storage format (e.g., the format of three data chunks followed by one parity chunk thereof for every four chunks) as shown in Table 1A, and generate the ECC-encoded data in the expanded ECC-encoded data format (e.g., the format of three encoded data chunks followed by one encoded parity chunk corresponding to the three encoded data chunks for every four encoded chunks) as shown in Table 1B, but the present invention is not limited thereto. According to some embodiments, the expansion storage format, the expanded ECC-encoded data format, the ratio of the parity chunk count to the data chunk count in the expansion storage format, and/or the ratio of the encoded parity chunk count to the encoded data chunk count in the expanded ECC-encoded data format may vary.

Figure 7:
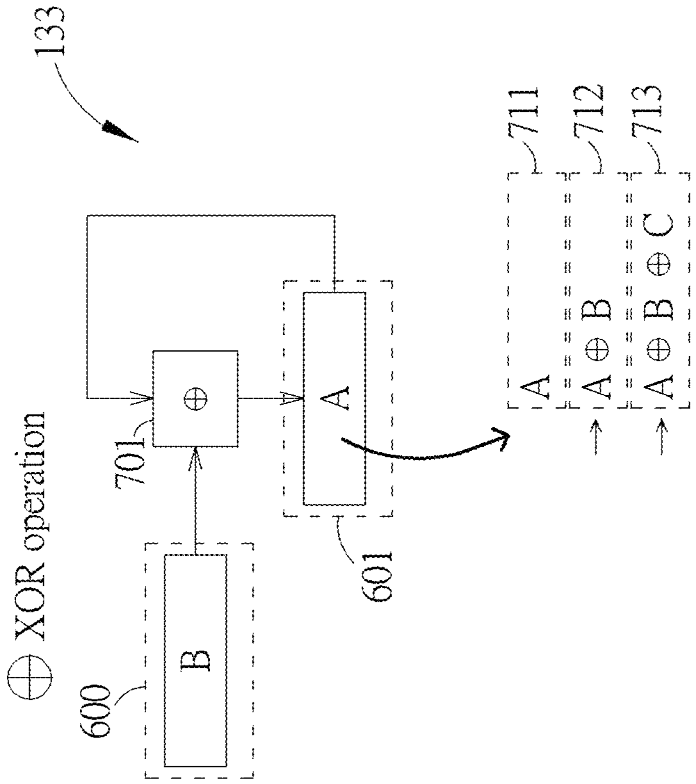
FIG. 7 illustrates some implementation details of the in-channel data-expansion and encoding control scheme shown in FIG. 6 according to an embodiment of the present invention.

FIG. 7 illustrates some implementation details of the in-channel data-expansion and encoding control scheme shown in FIG. 6 according to an embodiment of the present invention. The enhanced data protection circuit 133 shown in FIG. 1 may comprise the TSB 600 and the in-channel buffer 601 shown in FIG. 6, and further comprise an exclusive OR (XOR) calculation circuit 701 as well as the associated signal paths for performing the data expansion. For example, the flash memory controller 110 may perform the data expansion with the enhanced data protection circuit 133 to prepare the series of small chunks in the expansion storage format as shown in Table 1A, and the associated operations may comprise:

(1) in an initial phase among multiple phases of the data expansion, the enhanced data protection circuit 133 may clear the in-channel buffer 601 to set a null chunk such as a zero chunk with all bits thereof being zero by default;

(2) in a first phase among the multiple phases, the enhanced data protection circuit 133 may obtain a data chunk A from the TSB 600 and output the data chunk A as the chunk #1 (e.g., the data chunk) in the expansion storage format shown in Table 1A, and perform a bitwise XOR operation on the null chunk (e.g., the zero chunk) in the in-channel buffer 601 and the data chunk A from the TSB 600 with the XOR calculation circuit

701 to generate a first XOR calculation result 711 which is equal to the data chunk A;

(3) in a second phase among the multiple phases, the enhanced data protection circuit 133 may obtain a data chunk B from the TSB 600 and output the data chunk B as the chunk #2 (e.g., the data chunk) in the expansion storage format shown in Table 1A, and perform a bitwise XOR operation on the first XOR calculation result 711 (e.g., the data chunk A) in the in-channel buffer 601 and the data chunk B from the TSB 600 with the XOR calculation circuit 701 to generate a second XOR calculation result 712 which is equal to the bitwise XOR calculation result of the data chunks A and B;

(4) in a third phase among the multiple phases, the enhanced data protection circuit 133 may obtain a data chunk C from the TSB 600 and output the data chunk C as the chunk #3 (e.g., the data chunk) in the expansion storage format shown in Table 1A, and perform a bitwise XOR operation on the second XOR calculation result 712 (e.g., the bitwise XOR calculation result of the data chunks A and B) in the in-channel buffer 601 and the data chunk C from the TSB 600 with the XOR calculation circuit 701 to generate a third XOR calculation result 713 which is equal to the bitwise XOR calculation result of the data chunks A, B and C; and (5) in a fourth phase among the multiple phases, the enhanced data protection circuit 133 may output the third XOR calculation result 713 (e.g., the bitwise XOR calculation result of the data chunks A, B and C) as the chunk #4 (e.g., the parity chunk) in the expansion storage format shown in Table 1A;

where the enhanced data protection circuit 133 may selectively set the multiplexer circuit 602 with the selection signal SEL to be in a default input state (e.g., a data-chunk input state) corresponding to a default input (e.g., the lower input for receiving the data chunks as shown in FIG. 6), for sending the data chunks A, B and C to the ECC encoder 610 in the first phase, the second phase and the third phase, respectively, and may selectively set the multiplexer circuit 602 with the selection signal SEL to be in a first predetermined input state (e.g., a parity-chunk input state) corresponding to a first predetermined input (e.g., the upper input for receiving the parity chunk as shown in FIG. 6), for sending the third XOR calculation result 713 (e.g., the bitwise XOR calculation result of the data chunks A, B and C) to the ECC encoder 610 in the fourth phase, but the present invention is not limited thereto. In some examples, the expansion storage format and the ratio of the parity chunk count to the data chunk count in the expansion storage format may vary, and the associated operations may vary correspondingly.

TABLE 2A

| Chunks #1 . . . #(P − 1) | Chunk #P |
|---|---|
| Data chunks | Parity chunk |

TABLE 2B

| Encoded chunks #1 . . . #(P − 1) | Encoded chunk #P |
|---|---|
| Encoded data chunks | Encoded parity chunk |

Table 2A illustrates another example of the expansion storage format, and Table 2B illustrates another example of the expanded ECC-encoded data format corresponding to the expansion storage format, where the flash memory controller 110 may perform the data expansion with the enhanced data protection circuit 133 to prepare the series of small chunks in the expansion storage format (e.g., the format of (P−1) data chunks followed by one parity chunk thereof for every P chunks) as shown in Table 2A, and generate the ECC-encoded data in the expanded ECC-encoded data format (e.g., the format of (P−1) encoded data chunks followed by one encoded parity chunk corresponding to the (P−1) encoded data chunks for every P encoded chunks) as shown in Table 2B, but the present invention is not limited thereto. According to some embodiments, the expansion storage format, the expanded ECC-encoded data format, the ratio (1/P) of the parity chunk count (e.g., 1) to the data/parity chunk count (e.g., P) in the expansion storage format, and/or the ratio (1/P) of the encoded parity chunk count (e.g., 1) to the encoded data/parity chunk count (e.g., P) in the expanded ECC-encoded data format may vary.

Figure 8:
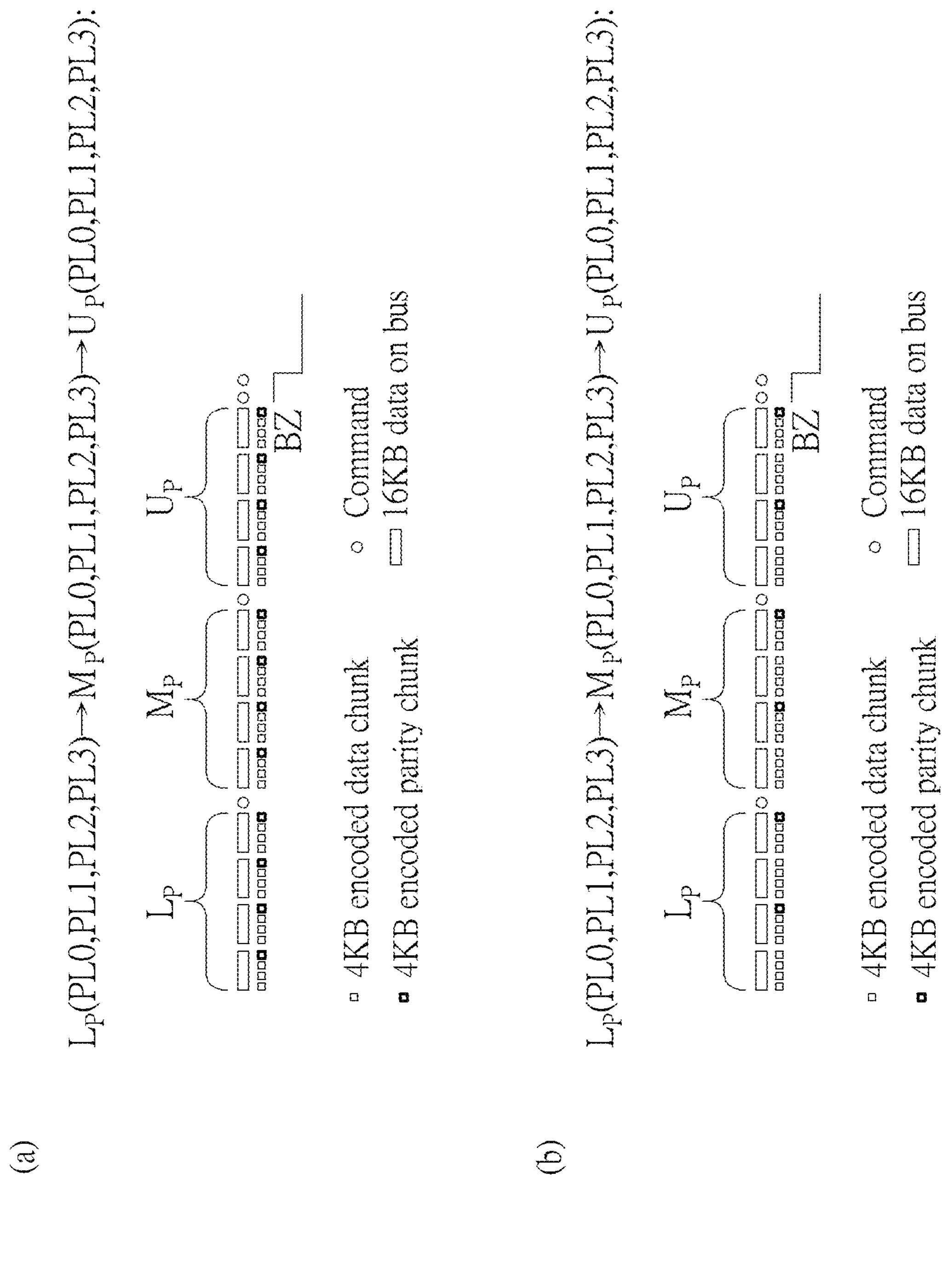
FIG. 8 illustrates a multi-plane program-sequence control scheme of the method according to an embodiment of the present invention.

FIG. 8 illustrates a multi-plane program-sequence control scheme of the method according to an embodiment of the present invention, where the sub-diagrams (a) and (b) may correspond to the case of P=4 and the case of P=8, respectively. Taking the TLC flash memory as an example of the flash memory module 120, a page in a block BLK that is configurable as a single-level cell (SLC) block may be split into three pages corresponding to the three levels of TLCs, such as a lower page $L_P$, a middle page $M_P$ and an upper page $U_P$ respectively corresponding to a lower level, a middle level and an upper level among the three levels, when the same block BLK is configured as a TLC block, where the planes {PL} in the chip/die corresponding to the aforementioned any chip enable signal CE (e.g., one of the chip enable signals {CE0, CE1}) in the aforementioned any channel CH among the multiple channels {CH} may comprise the planes {PL0, PL1, PL2, PL3}, but the present invention is not limited thereto. According to some embodiments, the level count per cell (e.g., three) of the memory cells (e.g., the TLCs) in the flash memory module 120 and/or the plane count (e.g., four) of the planes {PL} in the chip/die corresponding to the aforementioned any chip enable signal CE (e.g., one of the chip enable signals {CE0, CE1}) in the aforementioned any channel CH may vary. In addition, the program sequence for a set of pages corresponding to a same page address in the multi-plane flash memory (e.g., the four-planes flash memory) may be a program sequence of "cross-plane first" (or "the cross-plane first program sequence") in the order of: the lower page $L_P$ in the plane PL0, the lower page $L_P$ in the plane PL1, the lower page $L_P$ in the plane PL2, and the lower page $L_P$ in the plane PL3 (labeled "$L_P$(PL0, PL1, PL2, PL3)" for brevity); the middle page $M_P$ in the plane PL0, the middle page $M_P$ in the plane PL1, the middle page $M_P$ in the plane PL2, and the middle page $M_P$ in the plane PL3 (labeled "$M_P$(PL0, PL1, PL2, PL3)" for brevity); and the upper page $U_P$ in the plane PL0, the upper page $U_P$ in the plane PL1, the upper page $U_P$ in the plane PL2, and the upper page $U_P$ in the plane PL3 (labeled "$U_P$(PL0, PL1, PL2, PL3)" for brevity).

For example, when P=4, the enhanced data protection circuit 133 may obtain three data chunks A1, A2 and A3 (e.g., the aforementioned data chunks A, B and C of the embodiment shown in FIG. 7) from the TSB 600 and output the three data chunks A1, A2 and A3 as the chunks #1 . . . #(P−1) (e.g., the (P−1) data chunks, where (P−1)=3) in the expansion storage format shown in Table 2A, and perform three bitwise XOR operations to generate the XOR calculation results 711, 712 and 713, respectively, in order to output the third XOR calculation result 713 (e.g., the bitwise XOR calculation result of the three data chunks A1, A2 and A3) as the chunk #P (e.g., the one parity chunk) in the expansion storage format shown in Table 2A. The ECC encoder 610 may encode the three data chunks A1, A2 and A3 to generate three 4 KB encoded data chunks respectively corresponding to the three data chunks A1, A2 and A3 and encode the parity chunk (e.g., the bitwise XOR calculation result of the three data chunks A1, A2 and A3) to generate a 4 KB encoded parity chunk corresponding to the parity chunk, and output the three 4 KB encoded data chunks and the 4 KB encoded parity chunk to be a set of 16 KB data among multiple sets of 16 KB data, for being programmed into the flash memory module 120. For better comprehension, a series of 4 KB ECC chunks such as the 4 KB encoded data/parity chunks may be illustrated below the respective 16 KB data of the respective lower/middle/upper pages $\{L_P, M_P, U_P\}$ of the planes {PL0, PL1, PL2, PL3} within the timing chart shown in the sub-diagram (a).

In another example, when P=8, the enhanced data protection circuit 133 may obtain seven data chunks A1, A2 . . . and A7 (e.g., the aforementioned data chunks A, B and C of the embodiment shown in FIG. 7 and four more data chunks such as four subsequent data chunks D, E, F and G, not shown in FIG. 7) from the TSB 600 and output the seven data chunks A1, A2 . . . and A7 as the chunks #1 #(P−1) (e.g., the (P−1) data chunks, where (P−1)=7) in the expansion storage format shown in Table 2A, and perform seven bitwise XOR operations to generate seven corresponding XOR calculation results 711, 712, 713, etc., respectively, in order to output the seventh XOR calculation result (e.g., the bitwise XOR calculation result of the seven data chunks A1, A2 . . . and A7) among the seven corresponding XOR calculation results 711, 712, 713, etc. to be the chunk #P (e.g., the parity chunk) in the expansion storage format shown in Table 2A. The ECC encoder 610 may encode the seven data chunks A1, A2 . . . and A7 to generate seven 4 KB encoded data chunks respectively corresponding to the seven data chunks A1, A2 . . . and A7 and encode the parity chunk (e.g., the bitwise XOR calculation result of the seven data chunks A1, A2 . . . and A7) to generate a 4 KB encoded parity chunk corresponding to the parity chunk, and output the seven 4 KB encoded data chunks and the 4 KB encoded parity chunk to be two sets of 16 KB data among multiple sets of 16 KB data, for being programmed into the flash memory module 120. For better comprehension, a series of 4 KB ECC chunks such as the 4 KB encoded data/parity chunks may be illustrated below the respective 16 KB data of the respective lower/middle/upper pages $\{L_P, M_P, U_P\}$ of the planes {PL0, PL1, PL2, PL3} within the timing chart shown in the sub-diagram (b).

No matter whether the data/parity chunk count P in the expansion storage format (or the encoded data/parity chunk count P in the expanded ECC-encoded data format) is equal to four or eight, or any other value, the associated operations may comprise:

(1) the flash memory controller 110 may send a command to the flash memory module 120 first;

(2) the flash memory controller 110 may send four sets of 16 KB data (e.g., the respective 16 KB data of the lower pages $\{L_P\}$ in the planes PL0, PL1, PL2 and PL3) to the flash memory module 120 via the bus (or the data signals {DQ0, . . . , DQ7} thereon) in the channel CH;

(3) the flash memory controller 110 may send another command to the flash memory module 120;

(4) the flash memory controller 110 may send four other sets of 16 KB data (e.g., the respective 16 KB data of the middle pages $\{M_P\}$ in the planes PL0, PL1, PL2 and PL3) to the flash memory module 120 via the bus (or the data signals {DQ0, . . . , DQ7} thereon) in the channel CH;

(5) the flash memory controller 110 may send yet another command to the flash memory module 120;

(6) the flash memory controller 110 may send four more sets of 16 KB data (e.g., the respective 16 KB data of the upper pages $\{U_P\}$ in the planes PL0, PL1, PL2 and PL3) to the flash memory module 120 via the bus (or the data signals {DQ0, . . . , DQ7} thereon) in the channel CH;

(7) the flash memory controller 110 may send two more commands to the flash memory module 120, in order to trigger the corresponding programming operation in the flash memory module 120;

where the flash memory module 120 may program the twelve sets of 16 KB data obtained from the flash memory controller 110 in the above operations into the chip/die corresponding to the aforementioned any chip enable signal CE (e.g., one of the chip enable signals {CE0, CE1}) in the aforementioned any channel CH among the multiple channels {CH}. In addition, a busy signal BZ may be pulled down from a higher level to a lower level for indicating that the chip/die undergoing the programming operations is in a busy state, but the present invention is not limited thereto. For brevity, similar descriptions for this embodiment are not repeated in detail here.

According to some embodiments, the flash memory controller 110 may perform direct memory access (DMA) on an internal buffer of the flash memory module 120 to make the twelve sets of 16 KB data mentioned above be buffered in the internal buffer, for being programmed during the programming operation, but the present invention is not limited thereto. For brevity, similar descriptions for these embodiments are not repeated in detail here.

Figure 9:
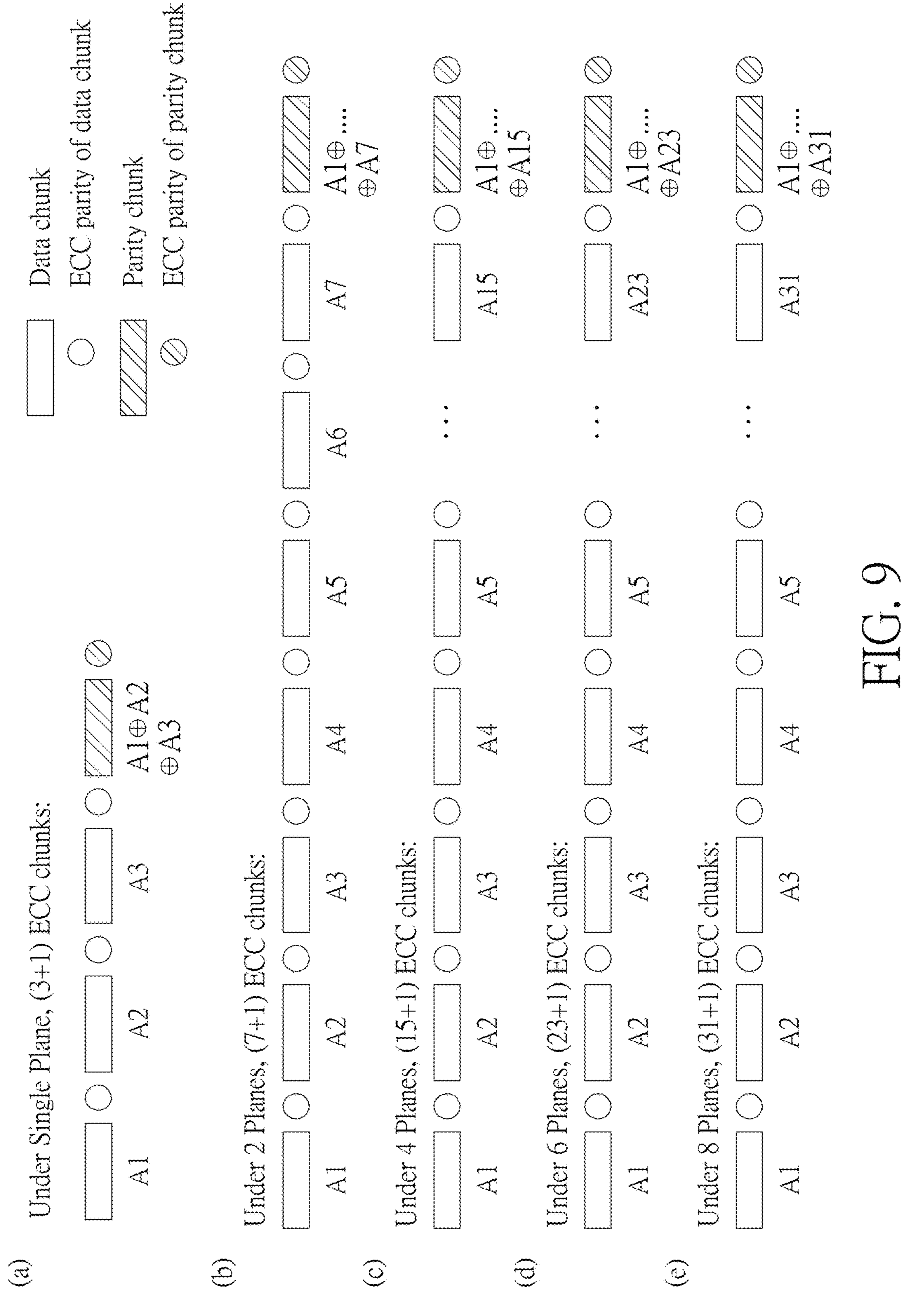
FIG. 9 illustrates various combinations of ECC chunks involved with the in-channel data-expansion and encoding control scheme shown in FIG. 6 according to different embodiments of the present invention.

FIG. 9 illustrates various combinations of ECC chunks involved with the in-channel data-expansion and encoding control scheme shown in FIG. 6 according to different embodiments of the present invention. As shown in the sub-diagram (a), under a Single Plane configuration, the P encoded chunks #1 . . . #P corresponding to P=4 in the expanded ECC-encoded data format shown in Table 2B may comprise (3+1) ECC chunks with each ECC chunk thereof comprising a data/parity chunk followed by an ECC parity of the data/parity chunk, such as the three data chunks A1, A2 and A3 (e.g., the aforementioned data chunks A, B and C) each of which followed by an ECC parity thereof, as well as the parity chunk (e.g., the bitwise XOR calculation result of the three data chunks A1, A2 and A3) followed by an ECC parity thereof.

As shown in the sub-diagram (b), under a Two/Duo (2) Planes configuration, the P encoded chunks #1 . . . #P corresponding to P=8 in the expanded ECC-encoded data format shown in Table 2B may comprise (7+1) ECC chunks with each ECC chunk thereof comprising a data/parity chunk followed by an ECC parity of the data/parity chunk, such as the seven data chunks A1, A2, A3, A4, A5, A6 and A7 each of which followed by an ECC parity thereof, as well as the parity chunk (e.g., the bitwise XOR calculation result of the seven data chunks A1, A2, A3, A4, A5, A6 and A7) followed by an ECC parity thereof.

As shown in the sub-diagram (c), under a Four/Quad (4) Planes configuration, the P encoded chunks #1 . . . #P corresponding to P=16 in the expanded ECC-encoded data format shown in Table 2B may comprise (15+1) ECC chunks with each ECC chunk thereof comprising a data/parity chunk followed by an ECC parity of the data/parity chunk, such as the fifteen data chunks A1, A2, A3, A4, A5 . . . and A15 each of which followed by an ECC parity thereof, as well as the parity chunk (e.g., the bitwise XOR calculation result of the fifteen data chunks A1, A2, A3, A4, A5 . . . and A15) followed by an ECC parity thereof.

As shown in the sub-diagram (d), under a Six (6) Planes configuration, the P encoded chunks #1 . . . #P corresponding to P=24 in the expanded ECC-encoded data format shown in Table 2B may comprise (23+1) ECC chunks with each ECC chunk thereof comprising a data/parity chunk followed by an ECC parity of the data/parity chunk, such as the twenty-three data chunks A1, A2, A3, A4, A5 . . . and A23 each of which followed by an ECC parity thereof, as well as the parity chunk (e.g., the bitwise XOR calculation result of the twenty-three data chunks A1, A2, A3, A4, A5 . . . and A23) followed by an ECC parity thereof.

As shown in the sub-diagram (e), under an Eight (8) Planes configuration, the P encoded chunks #1 #P corresponding to P=32 in the expanded ECC-encoded data format shown in Table 2B may comprise (31+1) ECC chunks with each ECC chunk thereof comprising a data/parity chunk followed by an ECC parity of the data/parity chunk, such as the thirty-one data chunks A1, A2, A3, A4, A5 . . . and A31 each of which followed by an ECC parity thereof, as well as the parity chunk (e.g., the bitwise XOR calculation result of the thirty-one data chunks A1, A2, A3, A4, A5 . . . and A31) followed by an ECC parity thereof.

According to some embodiments, the plane count (e.g., one, two, four, six or eight) of the planes {PL} involved with the expanded ECC-encoded data format, the ECC chunk count P of the ECC chunks arranged according to the expanded ECC-encoded data format, and/or the combinations of ECC chunks may vary. For brevity, similar descriptions for these embodiments are not repeated in detail here.

Figure 10:
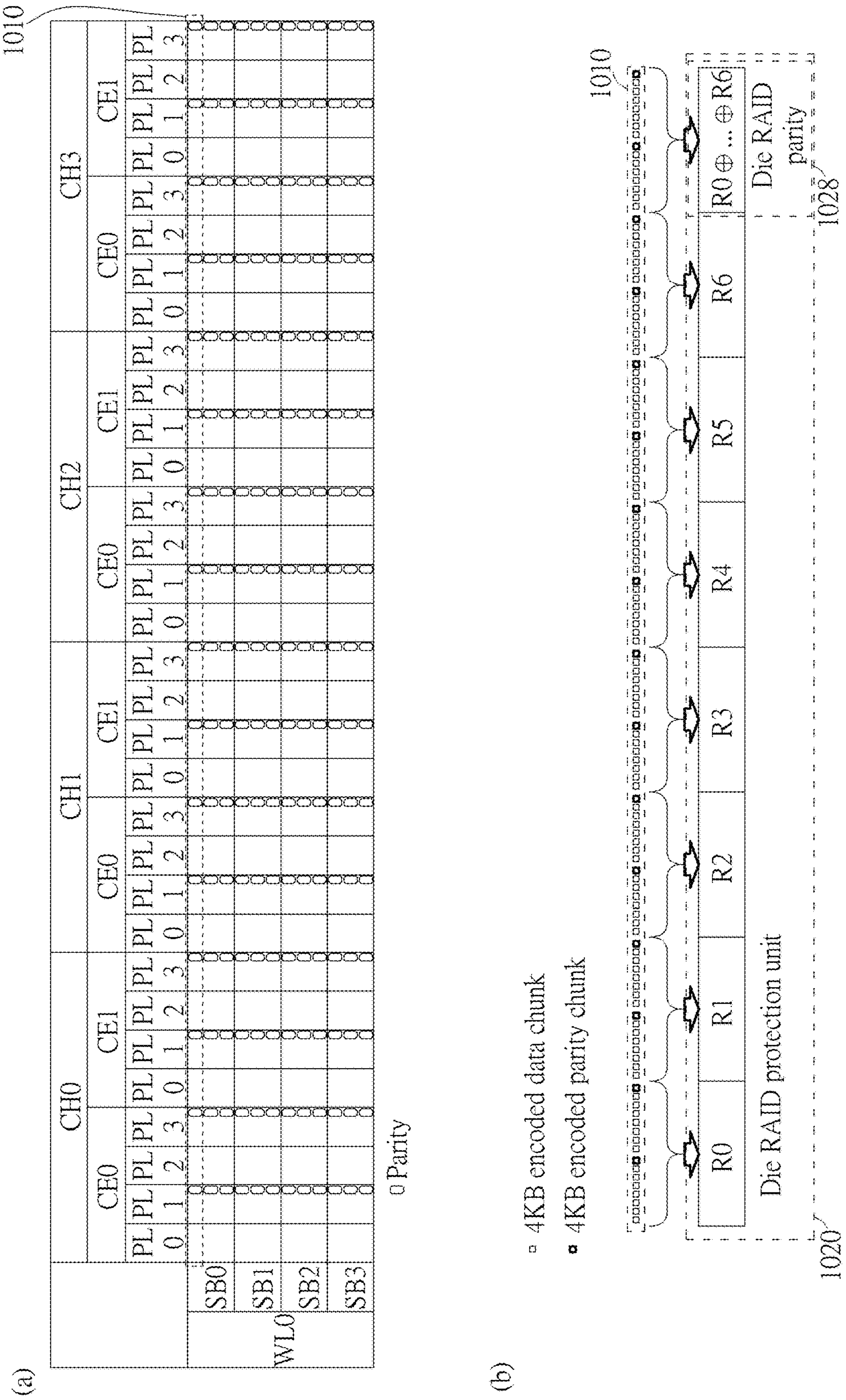
FIG. 10 illustrates, in the sub-diagrams (a) and (b) thereof, a fourth RAID parity location control scheme of the method and an associated die RAID protection unit according to an embodiment of the present invention.

FIG. 10 illustrates, in the sub-diagrams (a) and (b) thereof, a fourth RAID parity location control scheme of the method and an associated die RAID protection unit 1020 according to an embodiment of the present invention. Assuming that the multiple channels {CH} comprise the channels {CH0, CH1, CH2, CH3} and the multiple chip enable signals {CE} comprise the chip enable signals {CE0, CE1} and that the blocks {BLK} are configured as TLC blocks, the flash memory controller 110 may perform the enhanced data protection processing with the aid of the enhanced data protection circuit 133 to generate the parities at the ending part of the sub-blocks (or the strings) {SB0, SB1, SB2, SB3} in every two planes {PL} (e.g., the planes {PL0, PL1} or the planes {PL2, PL3}) of the planes {PL0, PL1, PL2, PL3} of the chips/dies respectively corresponding to the chip enable signals {CE0, CE1} in the channels {CH0, CH1, CH2, CH3} for the aforementioned any word-line set (e.g., the word-line set WL0), but the present invention is not limited thereto. According to some other embodiments, the level count per cell (e.g., three) of the memory cells (e.g., the TLCs) in the flash memory module 120, the channel count (e.g., four) of the channels {CH} (e.g., the channels {CH0, CH1, CH2, CH3}) in the flash memory module 120, the chip enable signal count (e.g., two) of the chip enable signals {CE} in the aforementioned any channel CH (e.g., one of the channels {CH0, CH1, CH2, CH3}), the plane count (e.g., four) of the planes {PL} in the chip/die corresponding to the aforementioned any chip enable signal CE (e.g., one of the chip enable signals {CE0, CE1}) in the aforementioned any channel CH, the sub-blocks/strings count (e.g., four) of the sub-blocks/strings {SB} in the aforementioned any word-line set (e.g., the word-line set WL0), and/or the parity locations may vary. For example, as the flash memory controller 110 may operate under any configuration among various single or multiple planes configurations such as the Single Plane configuration, the Two/Duo Planes configuration, the Four/Quad Planes configuration, the Six Planes configuration, the Eight Planes configuration, etc. as shown in FIG. 9, the associated operations and the associated parity locations may vary correspondingly.

As shown in the sub-diagram (a), the flash memory controller 110 may generate any row of ECC chunks among multiple rows of ECC chunks across the channels {CH0, CH1, CH2, CH3}, such as the first row of ECC chunks 1010, and the aforementioned any row of ECC chunks such as the first row of ECC chunks 1010 may comprise ((8*2)*8) ECC chunks (or 128 ECC chunks) in the expanded ECC-encoded data format shown in Table 2B with P=8. When there is a need, the flash memory controller 110 may prepare the data in the TSB 600 by using the RAID circuit 132, in order to generate the associated die RAID protection unit 1020. As shown in the sub-diagram (b), the flash memory controller 110 may perform the RAID protection processing with the aid of the RAID circuit 132 on multiple sets of RAID level data {R0, R1, R2, R3, R4, R5, R6} across the chips/dies corresponding to the respective chip enable signals {CE0, CE1} of the channels {CH0, CH1, CH2, CH3} to generate the die RAID parity 1028 (e.g., the bitwise XOR calculation result of the multiple sets of RAID level data {R0, R1, R2, R3, R4, R5, R6}), in order to protect the multiple sets of RAID level data {R0, R1, R2, R3, R4, R5, R6} with the die RAID parity 1028 within the die RAID protection unit 1020. For brevity, similar descriptions for this embodiment are not repeated in detail here.

Figure 11:
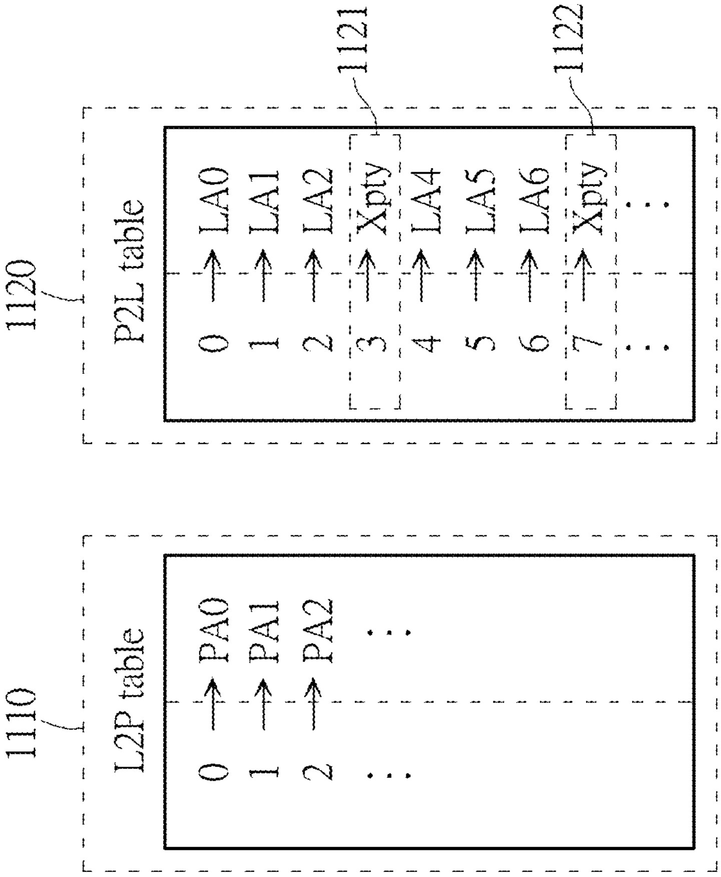
FIG. 11 illustrates a data-expansion-based address mapping information control scheme of the method according to an embodiment of the present invention.

FIG. 11 illustrates a data-expansion-based address mapping information control scheme of the method according to an embodiment of the present invention. As the flash memory controller 110 may perform the data expansion with the enhanced data protection circuit 133 to prepare the series of small chunks in the expansion storage format shown in Table 2A and generate the ECC-encoded data in the expanded ECC-encoded data format shown in Table 2B, an ECC chunk pattern of the (P−1) encoded data chunks followed by the one encoded parity chunk corresponding to the (P−1) encoded data chunks for every P encoded chunks may exist in the preloaded data, and when temporarily neglecting the respective ECC parities of the ECC chunks (e.g., the (P−1) encoded data chunks and the one encoded parity chunk coming after them), a chunk pattern of the (P−1) data chunks followed by the one parity chunk thereof for every P chunks may also exist in the preloaded data.

For example, the flash memory controller 110 may generate or update at least one logical-to-physical (L2P) address mapping table such as a global L2P address mapping table 1110 (labeled "L2P table" for brevity) to manage the relationships between the physical addresses (e.g., the physical addresses {PA0, PA1, PA2, . . . }) and the logical addresses (e.g., the logical addresses {0, 1, 2, . . . }), and the aforementioned at least one L2P address mapping table such as the global L2P address mapping table 1110 may be stored in the flash memory module 120, for the flash memory controller 110 to control the memory device 100 to access data in the flash memory module 120, where the L2P address mapping information in the aforementioned at least one L2P address mapping table may comprise multiple L2P table entries for mapping from the logical addresses (e.g., the logical addresses {0, 1, 2, . . . } in the global L2P address mapping table 1110) to the physical addresses (e.g., the physical addresses {PA0, PA1, PA2, . . . } in the global L2P address mapping table 1110), but the present invention is not limited thereto. In addition, the flash memory controller 110 may generate or update at least one physical-to-logical (P2L) address mapping table such as a P2L address mapping table 1120 (labeled "P2L table" for brevity) to manage the relationships between the logical addresses (e.g., the logical addresses {{LA0, LA1, LA2}, {LA4, LA5, LA6}, . . . }) and the physical addresses (e.g., the physical addresses {{0, 1, 2}, {4, 5, 6}, . . . }), and the aforementioned at least one P2L address mapping table such as the P2L address mapping table 1120 may be stored in the flash memory module 120, where the P2L address mapping information in the aforementioned at least one P2L address mapping table may comprise multiple P2L table entries for mapping from the physical addresses (e.g., the physical addresses {{0, 1, 2}, {4, 5, 6}, . . . } in the P2L address mapping table 1120) to the logical addresses (e.g., the logical addresses {{LA0, LA1, LA2}, {LA4, LA5, LA6}, . . . } in the P2L address mapping table 1120). When there is a need, the flash memory controller 110 may refer to the aforementioned at least one P2L address mapping table such as the P2L address mapping table 1120 to perform some internal management operations such as GC operations, etc.

As the preloaded data had been expanded by the flash memory controller 110 to have an expanded ECC chunk pattern (e.g., the aforementioned ECC chunk pattern of the (P−1) encoded data chunks followed by the one encoded parity chunk corresponding to the (P−1) encoded data chunks for every P encoded chunks) as well as an expanded chunk pattern (e.g., the aforementioned chunk pattern of the (P−1) data chunks followed by the one parity chunk thereof for every P chunks, the flash memory controller 110 may generate multiple pseudo P2L table entries (e.g., multiple invalid P2L table entries) among the multiple P2L table entries in the aforementioned at least one P2L address mapping table for all encoded parity chunks like the encoded chunk #P in the expanded ECC-encoded data format shown in Table 2B (or for all parity chunks like the chunk #P in the expansion storage format shown in Table 2A), to make the multiple P2L table entries have an expanded P2L table entry pattern corresponding to the expanded ECC chunk pattern (or the expanded chunk pattern). For example, the flash memory controller 110 may generate a pseudo P2L table entry (e.g., an invalid P2L table entry) for every P P2L table entries among the multiple P2L table entries in the aforementioned at least one P2L address mapping table.

As shown in FIG. 11, when P=4, the flash memory controller 110 may generate the multiple P2L table entries having the expanded P2L table entry pattern, for mapping from the physical addresses {{0, 1, 2, 3}, {4, 5, 6, 7}, . . . } to the logical addresses {{LA0, LA1, LA2, Xpty}, {LA4, LA5, LA6, Xpty}, . . . }, and the multiple pseudo P2L table entries such as the multiple invalid P2L table entries may comprise the P2L table entries 1121, 1122, etc. conforming the expanded P2L table entry pattern, where "Xpty" may represent a pseudo logical address such as an invalid logical address that is not used by the host device 50, but the present invention is not limited thereto. According to some embodiments, the expanded chunk pattern and the expanded ECC chunk pattern may vary when the expansion storage format, the expanded ECC-encoded data format, the data/parity chunk count P in the expansion storage format and the encoded data/parity chunk count P in the expanded ECC-encoded data format vary, and the expanded P2L table entry pattern may vary correspondingly. More particularly, the flash memory controller 110 may generate the multiple P2L table entries having the expanded P2L table entry pattern (e.g., the pattern of (P−1) real/valid P2L table entries followed by one pseudo/invalid P2L table entry for every P P2L table entries), for mapping from the physical addresses {{0, 1, . . . , (P−2), (P−1)}, {P, (P+1), . . . , ((2*P)−2), ((2*P)−1)}, . . . } to the logical addresses {{LA0, LA1, . . . , LA(P−2), Xpty}, {LA(P), LA(P+1), . . . , LA((2*P)−2), Xpty}, . . . }. For example, when P=8, the flash memory controller 110 may generate the multiple P2L table entries having the expanded P2L table entry pattern, for mapping from the physical addresses {{0, 1, 2, 3, 4, 5, 6, 7}, {8, 9, 10, 11, 12, 13, 14, 15}, . . . } to the logical addresses {{LA0, LA1, LA2, LA3, LA4, LA5, LA6, Xpty}, {LA8, LA9, LA10, LA11, LA12, LA13, LA14, Xpty}, . . . }, and the pseudo/invalid logical address Xpty in the P2L table entry 1121 shown in FIG. 11 may be replaced with a real/valid logical address such as the logical address LA3.

In addition, the flash memory controller 110 may store the pseudo/invalid logical addresses {Xpty} in the aforementioned at least one P2L address mapping table such as the P2L address mapping table 1120 according to the expanded P2L table entry pattern, for indicating that the ECC chunks stored at the physical addresses (e.g., the physical addresses {3, 7, . . . } in the P2L address mapping table 1120) corresponding to the multiple pseudo P2L table entries (e.g., the multiple invalid P2L table entries) are the encoded parity chunks like the encoded chunk #P in the expanded ECC-encoded data format shown in Table 2B, to allow the flash memory controller 110 to perform the aforementioned expansion-to-non-expansion storage format conversion via the GC with ease, having no problem of recovering the preloaded data from errors after the high temperature reflow process and the abnormal temperature storage. During the expansion-to-non-expansion storage format conversion, the flash memory controller 110 may identify the encoded parity chunks with ease for performing error correction when detecting any error in the preloaded data. According to some viewpoint, the pseudo/invalid logical address Xpty may be regarded as a parity flag, for indicating a pseudo address mapping relationship between the data expansion (or the parity generation thereof) and the physical address at which an encoded parity chunk (e.g., one of these encoded parity chunks) is stored, and the multiple P2L table entries having the expanded P2L table entry pattern may indicate the real address mapping relationships regarding the encoded data chunks like the encoded chunks #1 to #(P−1) in the expanded ECC-encoded data format shown in Table 2B as well as the pseudo address mapping relationships regarding the encoded parity chunks like the encoded chunk #P in the expanded ECC-encoded data format shown in Table 2B. For brevity, similar descriptions for this embodiment are not repeated in detail here.

In the embodiment shown in FIG. 11, the flash memory controller 110 may record the multiple L2P table entries in the aforementioned at least one L2P address mapping table such as the global L2P address mapping table 1110 to be the L2P table entries {(0, PA0), (1, PA1), (2, PA2), . . . }, and record the multiple P2L table entries in the aforementioned at least one P2L address mapping table such as the P2L address mapping table 1120 to be the P2L table entries {{(0, LA0), (1, LA1), (2, LA2), (3, Xpty)}, {(4, LA4), (5, LA5), (6, LA6), (7, Xpty)}, . . . }, but the present invention is not limited thereto. According to some embodiments, the aforementioned at least one L2P address mapping table such as the global L2P address mapping table 1110 and the aforementioned at least one P2L address mapping table such as the P2L address mapping table 1120 may vary. For example, the logical addresses in the aforementioned at least one L2P address mapping table, such as the logical addresses {0, 1, 2, . . . } in the global L2P address mapping table 1110, may be omitted, and the flash memory controller 110 may store the physical addresses {PA0, PA1, PA2, . . . } as the multiple L2P table entries since the ranking of the physical addresses {PA0, PA1, PA2, . . . } may correspond to the logical addresses {0, 1, 2, . . . } in the global L2P address mapping table 1110. In another example, the physical addresses in the aforementioned at least one P2L address mapping table, such as the physical addresses {{0, 1, 2, 3}, {4, 5, 6, 7}, . . . } in the P2L address mapping table 1120, may be omitted, and the flash memory controller 110 may store the logical addresses {{LA0, LA1, LA2, Xpty}, {LA4, LA5, LA6, Xpty}, . . . } as the multiple P2L table entries since the ranking of the logical addresses {{LA0, LA1, LA2, Xpty}, {LA4, LA5, LA6, Xpty}, . . . } may correspond to the physical addresses {{0, 1, 2, 3}, {4, 5, 6, 7}, . . . } in the P2L address mapping table 1120. For brevity, similar descriptions for these embodiments are not repeated in detail here.

According to some embodiments, the global L2P address mapping table 1110 may be located in a predetermined region within the flash memory element 122-1, such as a system region, but the present invention is not limited thereto. For example, the global L2P address mapping table 1110 may be divided into a plurality of local L2P address mapping tables, and the plurality of local L2P address mapping tables may be stored in one or more of the plurality of flash memory elements 122-1, 122-2 . . . and 122-N, and more particularly, may be stored in the plurality of flash memory elements 122-1, 122-2 . . . and 122-N, respectively. When there is a needed, the flash memory controller 110 may load at least one portion (e.g., a portion or all) of the global L2P address mapping table 1110 into the RAM 116 or other memories. For example, the flash memory controller 110 may load a local L2P address mapping table (e.g., a first local L2P address mapping table) among the plurality of local L2P address mapping tables into the RAM 116 to be a temporary L2P address mapping table, for accessing data in the flash memory module 120 according to the local L2P address mapping table which is stored as the temporary L2P address mapping table. In addition, the aforementioned at least one P2L address mapping table such as the P2L address mapping table 1120 may be divided into a plurality of local P2L address mapping tables, and the plurality of local P2L address mapping tables may be stored in one or more of the plurality of flash memory elements 122-1, 122-2 . . . and 122-N, and more particularly, may be stored in the plurality of flash memory elements 122-1, 122-2 . . . and 122-N, respectively. When there is a needed, the flash memory controller 110 may load at least one portion (e.g., a portion or all) of the aforementioned at least one P2L address mapping table (e.g., the P2L address mapping table 1120) into the RAM 116 or other memories. The flash memory controller 110 may load a local P2L address mapping table (e.g., a first local P2L address mapping table) among the plurality of local P2L address mapping tables into the RAM 116 to be a temporary P2L address mapping table, for performing the internal management operations such as the GC operations, etc. according to the local P2L address mapping table which is stored as the temporary P2L address mapping table. For brevity, similar descriptions for these embodiments are not repeated in detail here.

Figure 12:
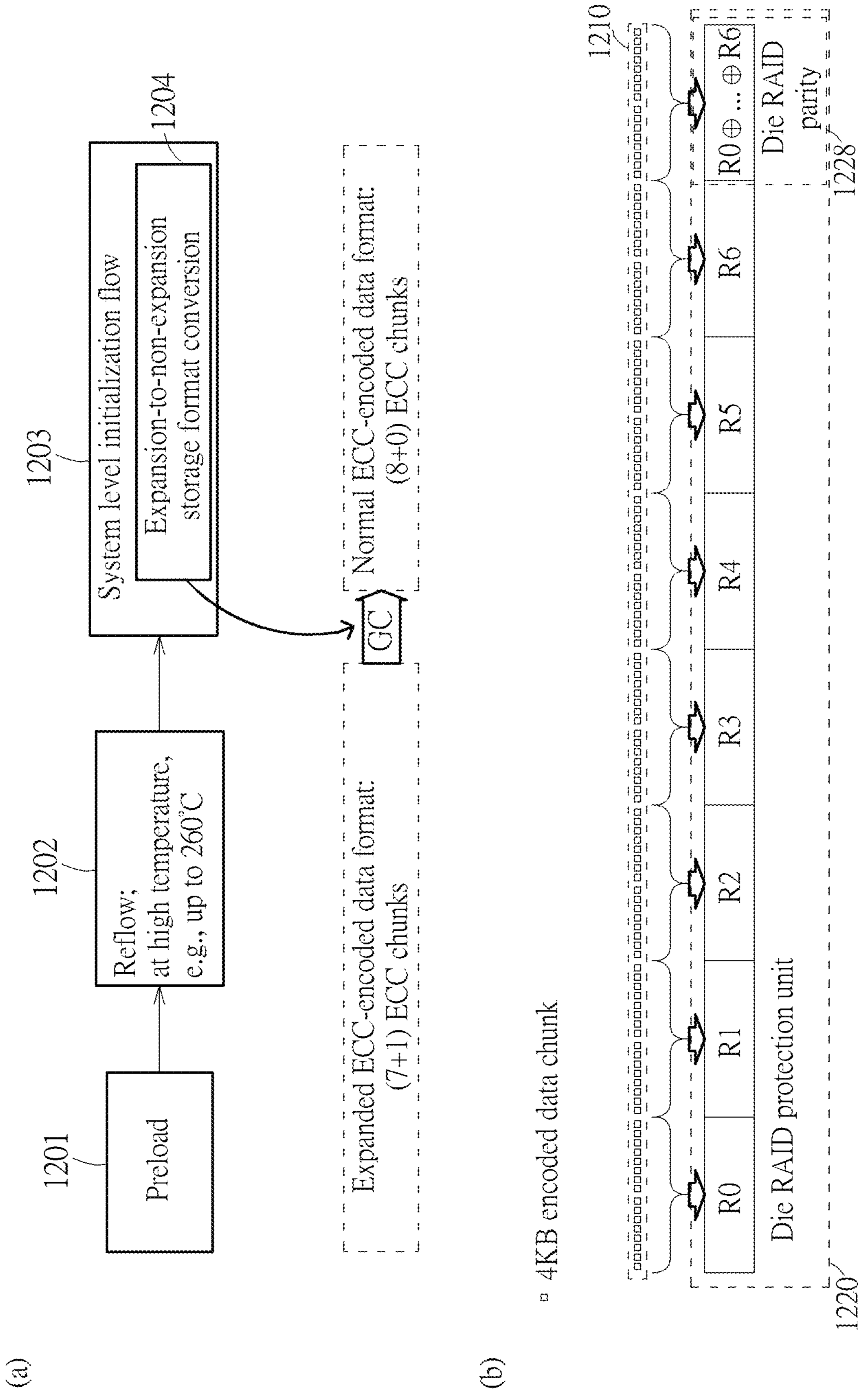
FIG. 12 illustrates, in the sub-diagrams (a) and (b) thereof, a normal format recovery and data recovery control scheme of the method and an associated die RAID protection unit according to an embodiment of the present invention.

FIG. 12 illustrates, in the sub-diagrams (a) and (b) thereof, a normal format recovery and data recovery control scheme of the method and an associated die RAID protection unit according to an embodiment of the present invention. The preloading operation, the reflow process and the expansion-to-non-expansion storage format conversion mentioned in the embodiment shown in FIG. 6 may be referred to as the preloading operation 1201 (labeled "Preload" for brevity), the reflow process 1202 (labeled "Reflow" for brevity) and the expansion-to-non-expansion storage format conversion 1204, respectively, and the system level initialization mentioned in the embodiment shown in FIG. 6 may be implemented as a system level initialization working flow such as the system level initialization flow 1203.

Before the mounting operation corresponding to the reflow process 1202, such as the operation of mounting the memory device 100 onto the PCB of the host device 50 within the electronic device 10 such as the multifunctional in-vehicle system via the reflow process 1202, the flash memory controller 110 may perform the preloading operation 1201 under the control of a manufacturing tool, where the data to be preloaded into the memory device 100 may be stored in a data storage device within the manufacturing tool in advance. The manufacturing tool may be configured to act as another host device before the memory device 100 is coupled to the host device 50 by the mounting operation. For better comprehension, the manufacturing tool may be implemented by way of a personal computer that is running a manufacturing tool program module, and may be equipped with a bridging device for coupling the memory device 100 to the manufacturing tool, and the data storage device therein may be implemented by way of a hard disk drive (HDD), but the present invention is not limited thereto. Regarding mounting the memory device 100 onto the PCB, the memory device 100 may undergo the reflow process 1202 that comprises heating at the high temperature (e.g., up to 260° C.) above the normal room temperature (e.g., 25° C.) for one or more predetermined periods of time (e.g., three to fifteen seconds, three times), which may cause many errors in the data that has been preloaded into the memory device 100. During the system level initialization flow 1203, the flash memory controller 110 may perform the expansion-to-non-expansion storage format conversion 1204 via the GC. For example, the operations of the expansion-to-non-expansion storage format conversion 1204 may comprise the GC and the error correction operations for correcting the errors in the preloaded data during the GC. As the preloaded data that is previously stored in the memory device 100 via the preloading operation 1201 may conform to the expanded ECC-encoded data format shown in Table 2B to provide the encoded parity chunks like the encoded chunk #P in the expanded ECC-encoded data format for performing the error correction operations, the preloaded data can remain recoverable from the errors even the errors are many.

The flash memory controller 110 may perform the GC to convert the storage format of the preloaded data from the expanded ECC-encoded data format (e.g., the format of the (P−1) encoded data chunks followed by the one encoded parity chunk corresponding to the (P−1) encoded data chunks for every P encoded chunks) as shown in Table 2B into the normal ECC-encoded data format (e.g., the format of P encoded data chunks, without the aforementioned one encoded parity chunk corresponding to the (P−1) encoded data chunks, for every P encoded chunks). As a result, the flash memory controller 110 may collect all data chunks from the preloaded data to generate the corresponding encoded data chunks (e.g., 4 KB encoded data chunks) with the ECC encoder 610 to be the latest ECC data chunks such as the row of ECC data chunks 1210, and release partial storage space among the total storage space occupied by the preloaded data previously stored in the expanded ECC-encoded data format during the preloading operation 1201, and more particularly, release the partial storage space having the same size (or approximately the same size) as that of the encoded parity chunks mentioned above, where the associated storage space release ratio (e.g., the ratio of the volume of the released partial storage space to the volume of the total storage space) may be equal to (or approximately equal to) the ratio (1/P) of the encoded parity chunk count (e.g., 1) to the encoded data/parity chunk count (e.g., P) in the expanded ECC-encoded data format.

As shown in the sub-diagram (a) of FIG. 12, when P=8, the expanded ECC-encoded data format may represent the format of (7+1) ECC chunks (e.g., seven encoded data chunks plus one encoded parity chunk), and the normal ECC-encoded data format may represent the format of (8+0) ECC chunks (e.g., eight encoded data chunks plus zero encoded parity chunk, without the aforementioned one encoded parity chunk), but the present invention is not limited thereto. According to some embodiments, the expanded ECC-encoded data format and the ratio (1/P) of the encoded parity chunk count (e.g., 1) to the encoded data/parity chunk count (e.g., P) in the expanded ECC-encoded data format may vary. In addition, during performing the expansion-to-non-expansion storage format conversion 1204 via the GC, as generating the encoded parity chunks like the encoded chunk #P in the expanded ECC-encoded data format is no longer needed, the flash memory controller 110 may operate according to the in-channel encoding control scheme shown in the upper half part of FIG. 6 to prepare the GC source data of the GC, such as the data for being programmed into the destination blocks $\{BLK_{DESTINATION}\}$. The flash memory controller 110 may prepare the GC source data of the GC in the TSB 600 by using the RAID circuit 132, in order to generate the associated die RAID protection unit 1220. As shown in the sub-diagram (b) of FIG. 12, the flash memory controller 110 may perform the RAID protection processing with the aid of the RAID circuit 132 on multiple sets of RAID level data {R0, R1, R2, R3, R4, R5, R6} across the chips/dies corresponding to the respective chip enable signals {CE0, CE1} of the channels {CH0, CH1, CH2, CH3} to generate the die RAID parity 1228 (e.g., the bitwise XOR calculation result of the multiple sets of RAID level data {R0, R1, R2, R3, R4, R5, R6}), in order to protect the multiple sets of RAID level data {R0, R1, R2, R3, R4, R5, R6} with the die RAID parity 1228 within the die RAID protection unit 1220. For brevity, similar descriptions for this embodiment are not repeated in detail here.

Figure 13:
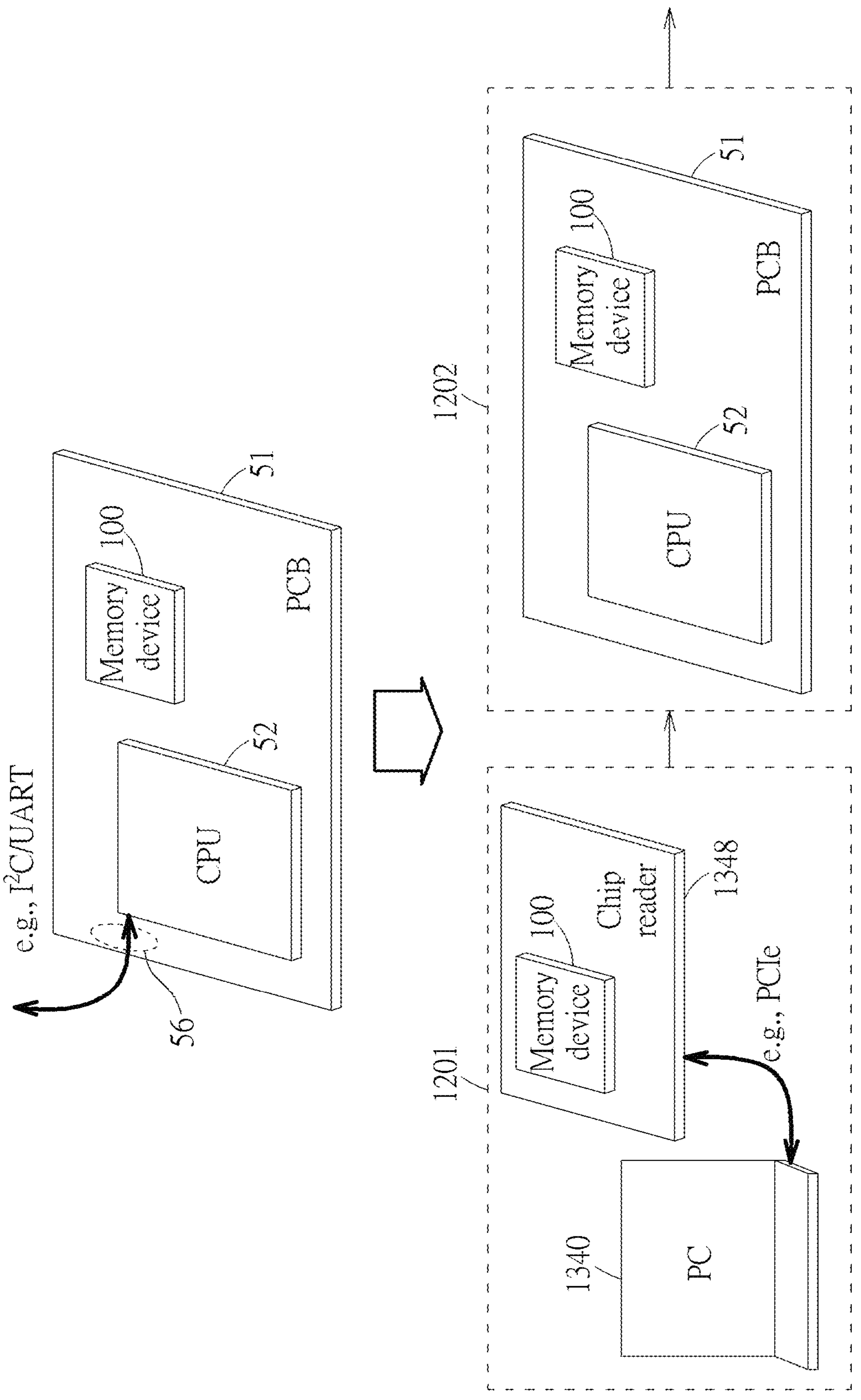
FIG. 13 illustrates, in the lower half part thereof, some implementation details of the normal format recovery and data recovery control scheme shown in FIG. 12 according to an embodiment of the present invention, where a non-preloading control scheme is illustrated in the upper half part of FIG. 13 for better comprehension.

FIG. 13 illustrates, in the lower half part thereof, some implementation details of the normal format recovery and data recovery control scheme shown in FIG. 12 according to an embodiment of the present invention, where a non-preloading control scheme is illustrated in the upper half part of FIG. 13 for better comprehension. The host device 50 may comprise the aforementioned PCB for mounting the memory device 100 thereon, such as the PCB 51, and comprise the processor 52 such as the CPU mentioned above (labeled "CPU" for brevity), as well as the aforementioned simple communication component such as the communication component 56 for providing the option of loading the system data of the electronic device 10 (e.g., the multifunctional in-vehicle system) into the memory device 100 at the low data rate by the processor 52 such as the CPU.

As the total time required for loading the system data at the low data rate via the simple communication component 56 is too long, the normal format recovery and data recovery control scheme as shown in the sub-diagram (a) of FIG. 12, the lower half part of FIG. 13, etc. is much better than the non-preloading control scheme shown in the upper half part of FIG. 13. For example, the manufacturing tool mentioned in the embodiment shown in FIG. 12 may be implemented as the personal computer 1340 that is running the manufacturing tool program module, and the bridging device of the manufacturing tool may be implemented as the chip reader 1348. The chip reader 1348 may comprise a set of connectors for coupling a set of terminals on the package of the memory device 100 to the internal circuits (e.g., a transmission interface circuit that is similar to or the same as the transmission interface circuit 58) of the chip reader 1348, and more particularly, comprise at least one holder for holding the memory device 100 onto the chip reader 1348 to guarantee the connections between the set of terminals of the memory device 100 and the set of connectors of the chip reader 1348. In addition, during the preloading operation 1201, the personal computer 1340 and the chip reader 1348 may communicate with each other via a link conforming to a predetermined protocol such as the PCIe protocol at a high data rate that is much higher than the low data rate, in order to reach the associated high throughput (e.g., 3.938 GB per second (GB/s) or higher), where the chip reader 1348 may act like a card reader, but the present invention is not limited thereto. For brevity, similar descriptions for this embodiment are not repeated in detail here.

According to some embodiments, the PCB 51, the processor 52 such as the CPU, the personal computer 1340, the chip reader 1348, and/or the predetermined protocol may vary. For brevity, similar descriptions for these embodiments are not repeated in detail here.

Figure 14:
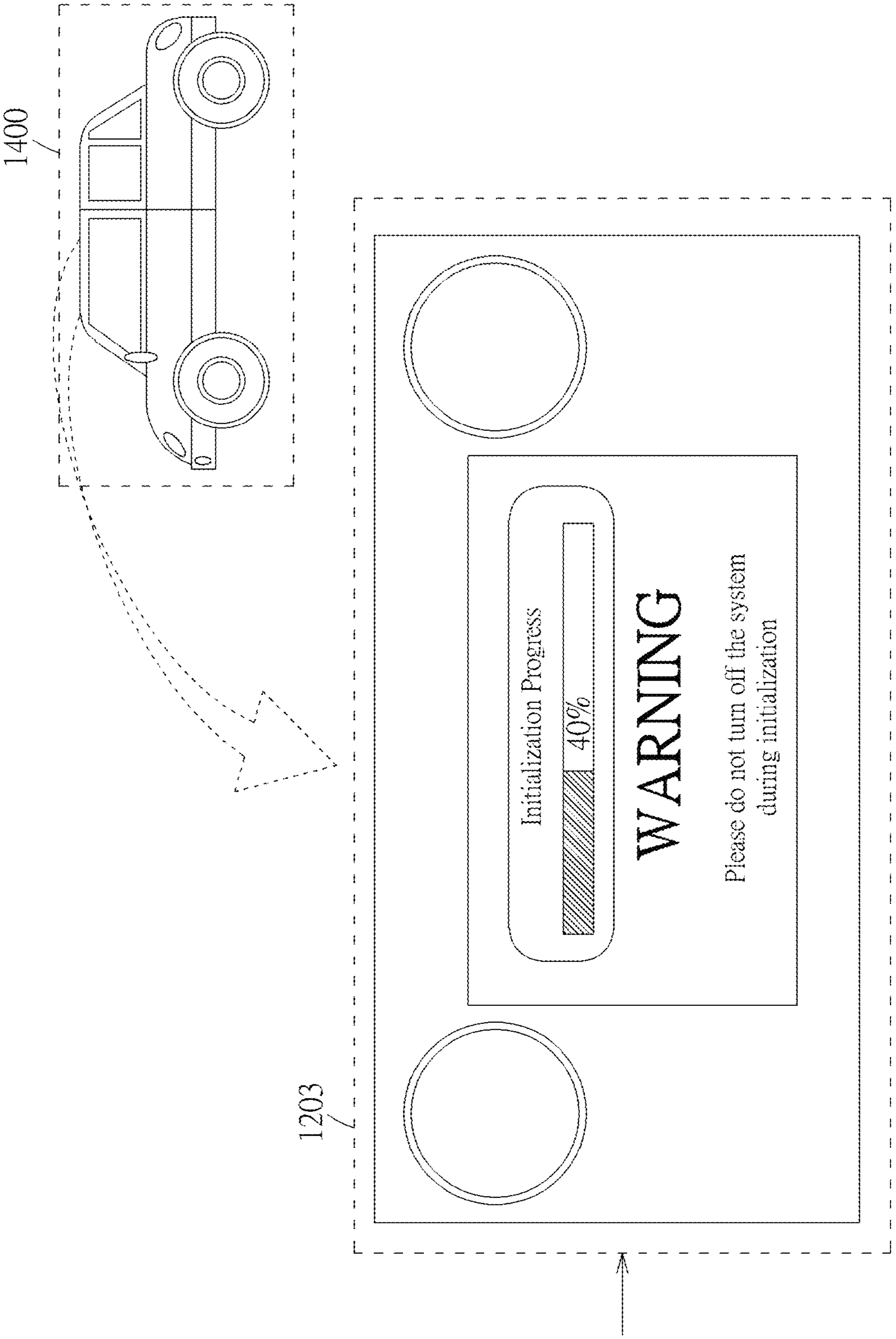
FIG. 14 illustrates some other implementation details of the normal format recovery and data recovery control scheme shown in FIG. 12 according to an embodiment of the present invention.

FIG. 14 illustrates some other implementation details of the normal format recovery and data recovery control scheme shown in FIG. 12 according to an embodiment of the present invention. The electronic device 10 such as the multifunctional in-vehicle system of a vehicle 1400 may perform the aforementioned system level initialization such as the system level initialization flow 1203 under the control of the host device 50 (or the processor 52). For example, the vehicle 1400 may be illustrated as a motor vehicle or an automotive vehicle not operated on rails, such as that with rubber tires for use on highways, etc., but the present invention is not limited thereto. As the time for performing the expansion-to-non-expansion storage format conversion 1204 by the flash memory controller 110 is hidden in the time for performing the system level initialization flow 1203, nobody will complain about any extra time required for performing the expansion-to-non-expansion storage format conversion 1204 since the system level initialization flow 1203 itself may take a long time such as one or more hours. In addition, the processor 52 such as the CPU may control a display device of the multifunctional in-vehicle system to display the initialization progress and the warning message (e.g., the message starting with "WARNING" and continuing with "Please do not turn off the system during initialization"), allowing any person in front of the display device to leave it alone and do something else without turning off the multifunctional in-vehicle system during the system level initialization flow 1203. For brevity, similar descriptions for this embodiment are not repeated in detail here.

According to some embodiments, the vehicle 1400 may vary. Examples of the vehicle 1400 may include, but are not limited thereto: planes, trains, and other vehicles.

Figure 15:
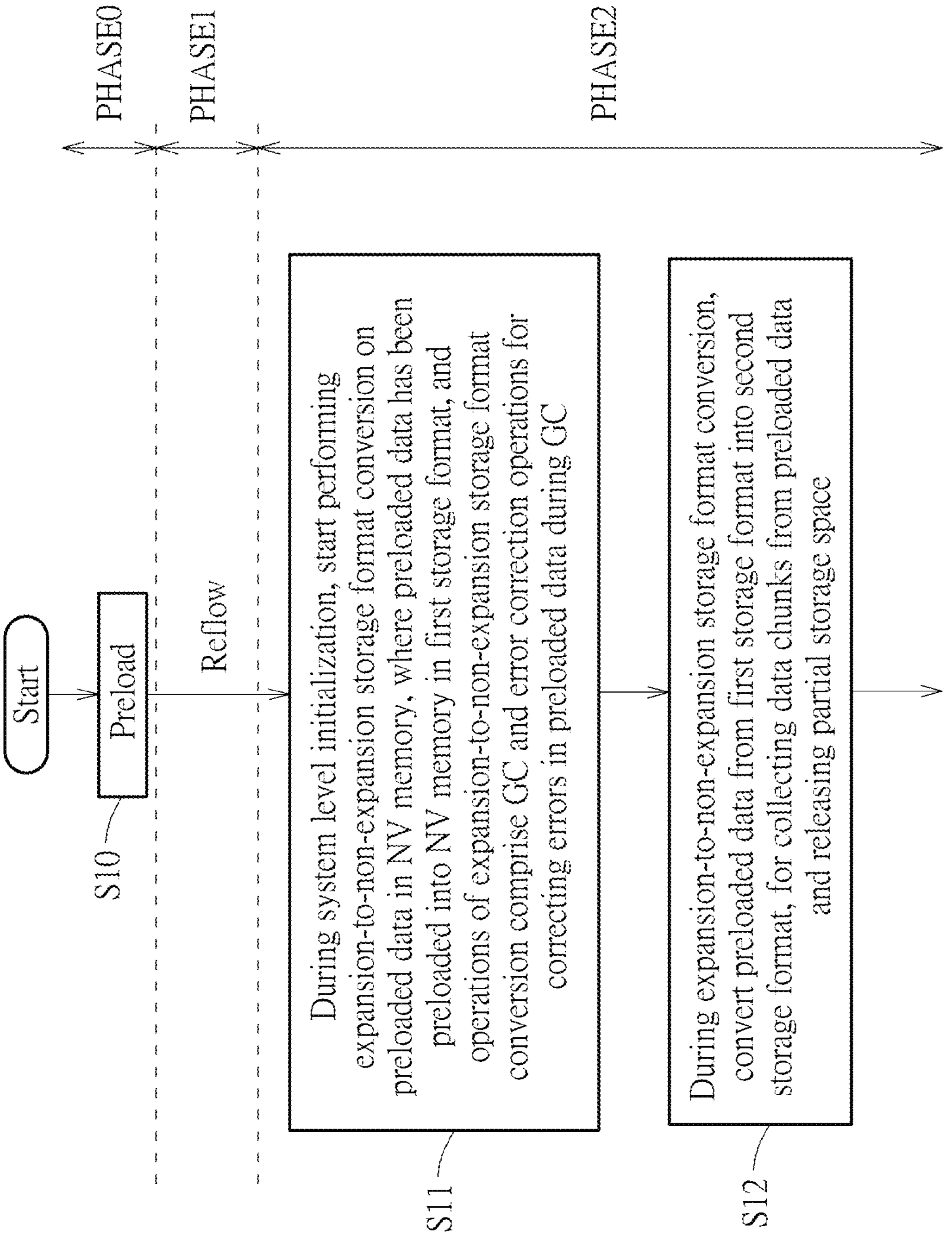
FIG. 15 illustrates a working flow of the method according to an embodiment of the present invention.

FIG. 15 illustrates a working flow of the method according to an embodiment of the present invention, where multiple phases such as a beginning phase PHASE0, a first phase PHASE1 coming after the beginning phase PHASE0, and a second phase PHASE2 coming after the first phase PHASE1 may be illustrated for better comprehension. The aforementioned memory controller such as the flash memory controller 110 may operate according to the working flow shown in FIG. 15 to execute Step S10 in the beginning phase PHASE0 and execute Steps S11 and S12 in the second phase PHASE2. For example, the beginning phase PHASE0 may represent the manufacturing phase of the memory device 100, and the first phase PHASE1 and the second phase PHASE2 may represent the manufacturing phase and the user phase of the electronic device 10, respectively, but the present invention is not limited thereto.

In Step S10, the flash memory controller 110 may perform data preloading onto the NV memory (e.g., the flash memory module 120) in the memory device 100, and more particularly, perform the preloading operation mentioned in the embodiment shown in FIG. 6 (labeled "Preload" for brevity), such as the preloading operation 1201 shown in FIG. 12 (or FIG. 13), in order to store the preloaded data in a first storage format (e.g., the expansion storage format shown in any table among Tables 1A and 2A, or the expanded ECC-encoded data format shown in any table among Tables 1B and 2B) within the NV memory such as the flash memory module 120.

In the first phase PHASE1 between the beginning phase PHASE0 and the second phase PHASE2, the memory device 100 may undergo the reflow process mentioned in the embodiment shown in FIG. 6 (labeled "Reflow" for brevity), such as the reflow process 1202 shown in FIG. 12 (or FIG. 13).

In Step S11, during the system level initialization of the electronic device 10 (e.g., the multifunctional in-vehicle system) as mentioned in the embodiment shown in FIG. 6, such as the system level initialization flow 1203 shown in FIG. 12 (or FIG. 14), the flash memory controller 110 may start performing the expansion-to-non-expansion storage format conversion on the preloaded data in the NV memory such as the flash memory module 120, where the preloaded data has been preloaded into the NV memory in the first storage format, for inserting extra parity information (e.g., the in-channel RAID protection parities) obtained from the in-channel coding among the multiple data chunks mentioned above, and the operations of the expansion-to-non-expansion storage format conversion may comprise the GC and multiple error correction operations for correcting multiple errors in the preloaded data during the GC.

In Step S12, during the expansion-to-non-expansion storage format conversion, the flash memory controller 110 may convert the preloaded data from the first storage format into a second storage format (e.g., an in-channel parity removed version of the format shown in any table among Tables 1A, 1B, 2A and 2B, with the last chunk thereof such as the encoded/non-encoded parity chunk being replaced with an encoded/non-encoded data chunk), for collecting the multiple data chunks from the preloaded data and releasing the partial storage space among the total storage space occupied by the preloaded data previously stored in the first storage format (e.g., the format shown in any table among Tables 1A, 1B, 2A and 2B). As shown in FIG. 15, in the second phase PHASE2, the flash memory controller 110 may perform the expansion-to-non-expansion storage format conversion during the system level initialization. More particularly, the expansion-to-non-expansion storage format conversion may be completed before the system level initialization ends.

Taking the architecture shown in FIG. 1 as an example, the data protection circuit 130 may comprise at least one ordinary data protection processing sub-circuit such as the ECC circuit 131 and the RAID circuit 132 as well as at least one extraordinary data protection processing sub-circuit such as the enhanced data protection circuit 133, for performing the ordinary data protection processing and the extraordinary data protection processing, respectively, where the ordinary data protection processing may comprise the ECC protection processing of the ECC circuit 131 and the RAID protection processing of the RAID circuit 132, and the extraordinary data protection processing may comprise the in-channel coding of the enhanced data protection circuit 133. In addition, the aforementioned at least one ordinary data protection processing sub-circuit such as the ECC circuit 131 may comprise at least one ECC encoder 610 for at least one channel CH among the multiple channels {CH}, such as the ECC encoder 610 shown in FIG. 6, and the aforementioned at least one extraordinary data protection processing sub-circuit such as the enhanced data protection circuit 133 may comprise at least one in-channel buffer 601 for the aforementioned at least one channel CH among the multiple channels {CH}, such as the in-channel buffer 601 shown in the sub-diagram (b) of FIG. 6, for buffering at least one in-channel RAID protection parity. During the expansion-to-non-expansion storage format conversion, the flash memory controller 110 may convert the preloaded data from the first storage format into the second storage format, for collecting the multiple data chunks from the preloaded data to generate the corresponding encoded data chunks (e.g., the 4 KB encoded data chunks shown in the sub-diagram (b) of FIG. 12) with the aforementioned at least one ECC encoder 610 to be the latest ECC data chunks (e.g., the row of ECC data chunks 1210 shown in the sub-diagram (b) of FIG. 12), and discarding at least the extra parity information (e.g., the 4 KB encoded parity chunks shown in the sub-diagram (b) of FIG. 10) to release the partial storage space.

Typically, the low data rate of the simple communication component 56 on the PCB 51 is insufficient for performing the data loading from outside of the PCB 51 onto the NV memory such as the flash memory module 120 in a manner faster than any other device (e.g., the manufacturing tool mentioned in the embodiment shown in FIG. 12, such as the personal computer 1340 shown in FIG. 13) for performing the data preloading from outside of the memory device 100 onto the NV memory. The flash memory controller 110 operating according to the method can perform the preloading operation 1201 in Step S10 at the high data rate that is much higher than the low data rate to save time, with the preloaded data being stored in the first storage format to remain recoverable from the multiple errors caused by the reflow process 1202, and start performing the expansion-to-non-expansion storage format conversion in Step S11 during the system level initialization in order to make the time for performing the expansion-to-non-expansion storage format conversion be hidden in the time for performing the system level initialization, where the preloaded data has been preloaded into the NV memory in the first storage format, for inserting the extra parity information such as the in-channel RAID protection parities, to allow the preloaded data to remain recoverable from the multiple errors even if the multiple errors are many due to the reflow process 1202. Therefore, the method and the associated apparatus can solve the related art problems without introducing any side effect or in a way that is less likely to introduce a side effect.

The aforementioned at least one NV memory element may comprise multiple NV memory elements such as the plurality of flash memory elements 122-1, 122-2 . . . and 122-N, and the flash memory controller 110 may access the multiple NV memory elements such as the plurality of flash memory elements 122-1, 122-2 . . . and 122-N in the multiple channels {CH} of the memory device 100, respectively, where regarding any channel CH among the multiple channels {CH}, the extra parity information obtained from the in-channel coding may comprise an in-channel RAID protection parity (e.g., any parity among the parities shown in the sub-diagram (b) of FIG. 5, or any parity among the parities shown in the sub-diagram (a) of FIG. 10) of a set of data chunks among the multiple data chunks for the RAID protection in this channel CH, rather than any cross-channel RAID protection parity (e.g., any parity among the parities shown in the sub-diagram (a) of FIG. 5, or the die RAID parity 1028 shown in the sub-diagram (b) of FIG. 10) for the RAID protection across the multiple channels {CH}. Regarding the above-mentioned any channel CH among the multiple channels {CH}, the aforementioned at least one ordinary data protection processing sub-circuit may comprise the ECC encoder 610 for performing the ECC encoding on the set of data chunks and the in-channel RAID protection parity in this channel CH, and the aforementioned at least one extraordinary data protection processing sub-circuit may comprise the in-channel buffer 601 for buffering the in-channel RAID protection parity, and further comprise the XOR calculation circuit 701 for performing at least one bitwise XOR operation on the set of data chunks to generate an XOR calculation result to be the in-channel RAID protection parity.

Taking the ECC encoded chunks shown in FIG. 8 regarding the aforementioned cross-plane first program sequence as an example, the preloaded data previously stored in the first storage format may comprise multiple sets of ECC chunks, such as multiple sets of 4 KB ECC chunks in the cross-plane first program sequence that have been programmed into the flash memory module 120, and a set of ECC chunks among the multiple sets of ECC chunks may comprise multiple encoded data chunks (e.g., multiple 4 KB encoded data chunks) carrying a set of data chunks followed by ECC parities of the set of data chunks, respectively, and comprise an encoded parity chunk (e.g., a 4 KB encoded parity chunk) carrying a parity chunk followed by a ECC parity of the parity chunk, where the parity chunk belongs to the extra parity information, and no longer exists in the second storage format. For example, among the multiple sets of ECC chunks, any set of ECC chunks conforming to the first storage format such as the expanded ECC-encoded data format shown in Table 2B may comprise the (P−1) encoded data chunks and the one encoded parity chunk corresponding to the (P−1) encoded data chunks, where "P" may represent a positive integer that is greater than one, and may be equal to a product of an ECC chunk count per sub-block and Q, and "Q" may represent a predetermined value corresponding to a predetermined configuration for storing the preloaded data in the first storage format. More particularly, any NV memory element among the aforementioned at least one NV memory element, such as the aforementioned any flash memory element 122-*n*, may comprise the multiple planes {PL} such as the four planes {PL0, PL1, PL2, PL3}, and the predetermined configuration may represent any predetermined Q-plane configuration among multiple predetermined Q-plane configurations (e.g., the aforementioned various single or multiple planes configurations) for storing the preloaded data in the first storage format, and the predetermined value is equal to a plane count of at least one plane occupied by the aforementioned any set of ECC chunks in the aforementioned any predetermined Q-plane configuration. This predetermined Q-plane configuration may represent the Single Plane configuration, the Two/Duo Planes configuration, the Four/Quad Planes configuration, the Six Planes configuration, the Eight Planes configuration, etc. for the cases of Q=1, Q=2, Q=4, Q=6, Q=8, etc., respectively. For brevity, similar descriptions for this embodiment are not repeated in detail here.

For better comprehension, the method may be illustrated with the working flow shown in FIG. 15, but the present invention is not limited thereto. According to some embodiments, one or more steps may be added, deleted, or changed in the working flow shown in FIG. 15. For example, the flash memory controller 110 may establish at least one address mapping table in the beginning phase PHASE0, and the aforementioned at least one address mapping table may comprise the aforementioned at least one L2P address mapping table such as the global L2P address mapping table 1110 as well as the aforementioned at least one P2L address mapping table such as the P2L address mapping table 1120, where the P2L address mapping information in the aforementioned at least one P2L address mapping table may comprise the multiple P2L table entries mentioned above, for mapping from the physical addresses to the logical addresses. Before starting performing the performing expansion-to-non-expansion storage format conversion in Step S11, the multiple P2L table entries may be arranged to have the aforementioned expanded P2L table entry pattern (e.g., the pattern of the (P−1) real P2L table entries followed by the one pseudo P2L table entry for every P P2L table entries), and may comprise multiple real P2L table entries interleaved with multiple pseudo P2L table entries in a pattern period of P entries, and any pseudo P2L table entry among the multiple pseudo P2L table entries, such as any P2L table entry among the pseudo P2L table entries 1121, 1122, etc. mapping to the pseudo logical address Xpty, may be an invalid P2L table entry failing to map from a physical address to any valid logical address. The pseudo logical address Xpty may be an invalid logical address that is not used by the host device 50, and more particularly, should be not equal to any valid logical address among all valid logical addresses that are used by the host device 50. After the expansion-to-non-expansion storage format conversion is completed, the multiple pseudo P2L table entries no longer exist in the aforementioned at least one P2L address mapping table such as the P2L address mapping table 1120. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing enhanced data protection of a memory device with aid of in-channel coding, the method being applicable to a memory controller of the memory device, the memory device comprising the memory controller and a non-volatile (NV) memory, the NV memory comprising at least one NV memory element, the memory device undergoing a reflow process for mounting the memory device onto a printed circuit board (PCB) of a host device within an electronic device, the method comprising:

during a system level initialization of the electronic device, utilizing the memory controller to start performing expansion-to-non-expansion storage format conversion on preloaded data in the NV memory, wherein the preloaded data has been preloaded into the NV memory in a first storage format, for inserting extra parity information obtained from the in-channel coding among multiple data chunks, and operations of the expansion-to-non-expansion storage format conversion comprise garbage collection (GC) and multiple error correction operations for correcting multiple errors in the preloaded data during the GC; and during the expansion-to-non-expansion storage format conversion, converting the preloaded data from the first storage format into a second storage format, for collecting the multiple data chunks from the preloaded data and releasing partial storage space among total storage space occupied by the preloaded data previously stored in the first storage format;

wherein the expansion-to-non-expansion storage format conversion is completed before the system level initialization ends.

2. The method of claim 1, wherein a data protection circuit within the memory controller comprises at least one ordinary data protection processing sub-circuit and at least one extraordinary data protection processing sub-circuit for performing ordinary data protection processing and extraordinary data protection processing, respectively, wherein the ordinary data protection processing comprises error correction code (ECC) protection processing and redundant array of independent disks (RAID) protection processing, and the extraordinary data protection processing comprises the in-channel coding.

3. The method of claim 2, wherein the at least one ordinary data protection processing sub-circuit comprises at least one ECC encoder; and during the expansion-to-non-expansion storage format conversion, the memory controller is arranged to convert the preloaded data from the first storage format into the second storage format, for collecting the multiple data chunks from the preloaded data to generate corresponding encoded data chunks with the at least one ECC encoder to be latest ECC data chunks, and discarding at least the extra parity information to release the partial storage space.

4. The method of claim 1, wherein a data rate of a communication component on the PCB is insufficient for performing data loading from outside of the PCB onto the NV memory in a manner faster than any other device for performing data preloading from outside of the memory device onto the NV memory.

5. The method of claim 1, wherein ordinary data protection processing of the memory controller comprises error correction code (ECC) protection processing and redundant array of independent disks (RAID) protection processing, and extraordinary data protection processing of the memory controller comprises the in-channel coding; and the at least one NV memory element comprises multiple NV memory elements, and the memory controller is arranged to access the multiple NV memory elements in multiple channels of the memory device, respectively, wherein regarding any channel among the multiple channels, the extra parity information obtained from the in-channel coding comprises an in-channel RAID protection parity of a set of data chunks among the multiple data chunks for RAID protection in the any channel, rather than any cross-channel RAID protection parity for RAID protection across the multiple channels.

6. The method of claim 5, wherein a data protection circuit within the memory controller comprises at least one ordinary data protection processing sub-circuit and at least one extraordinary data protection processing sub-circuit for performing the ordinary data protection processing and the extraordinary data protection processing, respectively, wherein regarding the any channel among the multiple channels, the at least one ordinary data protection processing sub-circuit comprises an ECC encoder, for performing ECC encoding on the set of data chunks and the in-channel RAID protection parity in the any channel, and the at least one extraordinary data protection processing sub-circuit comprises an in-channel buffer, for buffering the in-channel RAID protection parity.

7. The method of claim 6, wherein the at least one extraordinary data protection processing sub-circuit further comprises an exclusive OR (XOR) calculation circuit, for performing at least one bitwise XOR operation on the set of data chunks to generate an XOR calculation result to be the in-channel RAID protection parity.

8. The method of claim 1, wherein the preloaded data previously stored in the first storage format comprises multiple sets of error correction code (ECC) chunks, and a set of ECC chunks among the multiple sets of ECC chunks comprise multiple encoded data chunks carrying a set of data chunks followed by ECC parities of the set of data chunks, respectively, and comprise an encoded parity chunk carrying a parity chunk followed by a ECC parity of the parity chunk, wherein the parity chunk belongs to the extra parity information, and no longer exists in the second storage format.

9. The method of claim 1, wherein the at least one NV memory element comprises a plurality of blocks, and any block among the plurality of blocks comprises multiple sub-blocks; and the preloaded data previously stored in the first storage format comprises multiple sets of error correction code (ECC) chunks, and any set of ECC chunks conforming to the first storage format among the multiple sets of ECC chunks comprises (P−1) encoded data chunks and one encoded parity chunk, wherein P represents a positive integer that is greater than one, and is equal to a product of an ECC chunk count per sub-block and Q, and Q represents a predetermined value corresponding to a predetermined configuration for storing the preloaded data in the first storage format.

10. The method of claim 9, wherein any NV memory element among the at least one NV memory element comprises multiple planes; and the predetermined configuration represents any predetermined Q-plane configuration among multiple predetermined Q-plane configurations for storing the preloaded data in the first storage format, and the predetermined value is equal to a plane count of at least one plane occupied by the any set of ECC chunks in the any predetermined Q-plane configuration.

11. The method of claim 1, wherein the memory controller is arranged to establish at least one address mapping table, and the at least one address mapping table comprises at least one physical-to-logical (P2L) address mapping table for managing relationships between logical addresses and physical addresses, wherein P2L address mapping information in the at least one P2L address mapping table comprises multiple P2L table entries, for mapping from the physical addresses to the logical addresses; and before starting performing the performing expansion-to-non-expansion storage format conversion, the multiple P2L table entries comprise multiple real P2L table entries interleaved with multiple pseudo P2L table entries, wherein any pseudo P2L table entry among the multiple pseudo P2L table entries is an invalid P2L table entry failing to map from a physical address to any valid logical address.

12. The method of claim 11, wherein the preloaded data previously stored in the first storage format comprises multiple sets of error correction code (ECC) chunks, and any set of ECC chunks conforming to the first storage format among the multiple sets of ECC chunks comprises (P−1) encoded data chunks and one encoded parity chunk, wherein P represents a positive integer that is greater than one; and before starting performing the performing expansion-to-non-expansion storage format conversion, the multiple P2L table entries are arranged to have a pattern of (P−1) real P2L table entries followed by one pseudo P2L table entry for every P P2L table entries.

13. The method of claim 11, wherein after the expansion-to-non-expansion storage format conversion is completed, the multiple pseudo P2L table entries no longer exist in the at least one P2L address mapping table.

14. The method of claim 1, wherein in a beginning phase among multiple phases, the memory controller is arranged to perform data preloading onto the NV memory to store the preloaded data in the first storage format within the NV memory; in a first phase among the multiple phases, the first phase coming after the beginning phase, the memory device is arranged to undergo the reflow process; and in a second phase among the multiple phases, the second phase coming after the first phase, the memory controller is arranged to perform the expansion-to-non-expansion storage format conversion during the system level initialization.

15. The method of claim 1, wherein a time for performing the expansion-to-non-expansion storage format conversion is hidden in a time for performing the system level initialization.

16. The method of claim 1, wherein the preloaded data has been preloaded into the NV memory in the first storage format, for inserting the extra parity information obtained from the in-channel coding among the multiple data chunks, to allow the preloaded data to remain recoverable from the multiple errors even if the multiple errors are many due to the reflow process.

17. A memory controller, for performing enhanced data protection of a memory device with aid of in-channel coding, the memory device comprising the memory controller and a non-volatile (NV) memory, the NV memory comprising at least one NV memory element, the memory device undergoing a reflow process for mounting the memory device onto a printed circuit board (PCB) of a host device within an electronic device, the memory controller comprising:

a processing circuit, arranged to control the memory controller according to a plurality of host commands from the host device, to allow the host device to access the NV memory through the memory controller;

wherein:

during a system level initialization of the electronic device, the memory controller is arranged to start performing expansion-to-non-expansion storage format conversion on preloaded data in the NV memory, wherein the preloaded data has been preloaded into the NV memory in a first storage format, for inserting extra parity information obtained from the in-channel coding among multiple data chunks, and operations of the expansion-to-non-expansion storage format conversion comprise garbage collection (GC) and multiple error correction operations for correcting multiple errors in the preloaded data during the GC; and during the expansion-to-non-expansion storage format conversion, the memory controller is arranged to convert the preloaded data from the first storage format into a second storage format, for collecting the multiple data chunks from the preloaded data and releasing partial storage space among total storage space occupied by the preloaded data previously stored in the first storage format;

wherein the expansion-to-non-expansion storage format conversion is completed before the system level initialization ends.

18. The memory device comprising the memory controller of claim 17, wherein the memory device comprises:

the NV memory, configured to store information; and the memory controller, coupled to the NV memory, configured to control operations of the memory device.

19. The electronic device comprising the memory device of claim 18, and further comprising:

the host device, coupled to the memory device, wherein the host device comprises:

at least one processor, arranged for controlling operations of the host device; and a power supply circuit, coupled to the at least one processor, arranged for providing power to the at least one processor and the memory device;

wherein the memory device provides the host device with storage space.

* * * * *